US010545223B2

(12) United States Patent
Hayakawa et al.

(10) Patent No.: US 10,545,223 B2
(45) Date of Patent: Jan. 28, 2020

(54) OPTICAL SCANNING OBJECT DETECTION DEVICE DETECTING OBJECT THAT INVADES DETECTION AREA

(71) Applicant: Konica Minolta, Inc., Tokyo (JP)

(72) Inventors: Shuhei Hayakawa, Tokyo (JP); Hikaru Nagasawa, Saitama (JP); Masashi Kageyama, Tokyo (JP); Ryouta Ishikawa, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 395 days.

(21) Appl. No.: 15/422,515

(22) Filed: Feb. 2, 2017

(65) Prior Publication Data

US 2017/0219696 A1 Aug. 3, 2017

(30) Foreign Application Priority Data

Feb. 3, 2016 (JP) .................................. 2016-018723
Sep. 13, 2016 (JP) .................................. 2016-178440

(51) Int. Cl.
*G01S 7/481* (2006.01)

(52) U.S. Cl.
CPC .......... *G01S 7/4817* (2013.01); *G01S 7/4815* (2013.01)

(58) Field of Classification Search
CPC .... G01S 7/4811; G01S 7/4812; G01S 7/4815; G01S 7/4817
See application file for complete search history.

(56) References Cited

U.S. PATENT DOCUMENTS

| 5,187,606 | A | * | 2/1993 | Kondo | ..................... G02B 5/09 |
|-----------|---|---|--------|-------|------------------------------|
|           |   |   |        |       | 359/196.1                    |
| 5,268,565 | A | * | 12/1993| Katoh | ..................... G02B 5/09 |
|           |   |   |        |       | 235/462.31                   |
| 7,969,558 | B2|   | 6/2011 | Hall  |                              |
| 2003/0123045 | A1 | * | 7/2003 | Riegl | ................... G01C 15/002 |
|           |   |   |        |       | 356/4.01                     |

(Continued)

FOREIGN PATENT DOCUMENTS

| DE | 10 2004 033928 A1 | 2/2006 |
| JP | 2015/180956 A | 10/2015 |

(Continued)

OTHER PUBLICATIONS

Extended European Search Report in counterpart European Application No. 17 15 1369.0 dated Jun. 29, 2017 (7 pages).

*Primary Examiner* — Eric L Bolda
(74) *Attorney, Agent, or Firm* — Osha Liang LLP

(57) ABSTRACT

An object detection device includes a first optical transceiver that generates a first beam flux and receives a scattered portion of the first beam flux, a second optical transceiver that generates a second beam flux and receives a scattered portion of the second beam flux, and a mirror unit that rotates around a rotation axis. The first beam flux is reflected by the mirror unit and is scanned based on the rotation of the mirror unit, and the scattered portion of the first beam flux is generated by scattering of the first beam flux by an object. The scattered portion of the first beam flux is reflected by the mirror unit before being received by a light receiving portion of the first optical transceiver, and the second beam flux is reflected by the mirror unit and is scanned based on the rotation of the mirror unit.

13 Claims, 27 Drawing Sheets

(56) References Cited

U.S. PATENT DOCUMENTS

| | | | |
|---|---|---|---|
| 2004/0233460 A1* | 11/2004 | Ura | G01S 7/003 |
| | | | 356/601 |
| 2012/0187283 A1* | 7/2012 | Yamada | G01S 17/936 |
| | | | 250/234 |
| 2012/0206712 A1* | 8/2012 | Chang | G01S 17/87 |
| | | | 356/28 |
| 2016/0047902 A1* | 2/2016 | Ishikawa | G01S 17/42 |
| | | | 356/4.01 |
| 2016/0282468 A1* | 9/2016 | Gruver | H05K 999/99 |

FOREIGN PATENT DOCUMENTS

| | | |
|---|---|---|
| WO | 2011/021103 A1 | 2/2011 |
| WO | 2014/168137 A1 | 10/2014 |

\* cited by examiner

OPTICAL SCANNING OBJECT DETECTION DEVICE DETECTING OBJECT THAT INVADES DETECTION AREA

The entire disclosures of Japanese Patent Application No. 2016-018723 filed on Feb. 3, 2016 and No. 2016-178440 filed on Sep. 13, 2016 including description, claims, drawings, and abstract are incorporated herein by reference in its entirety.

BACKGROUND OF THE INVENTION

Field of the Invention

The present invention relates to an optical scanning type object detection device capable of detecting an object or the like which invades a detection area.

Description of the Related Art

In recent years, as crime prevention awareness rises, there is an increasing demand for a monitoring system capable of accurately detecting an object that has entered the detection area. As a method of detecting such an object, a radio wave radar which transmits radio waves to detect reflected waves has been proposed. However, it is difficult to accurately identify a position of a distant object from the viewpoint of resolution.

In contrast, WO 2011/021103 A discloses a TOF (time of flight) type measurement technique of emitting a laser beam while scanning with the laser beam, receiving a reflected beam reflected from a measurement object point, and acquiring distance information to the measurement object point on the basis of a time difference between an emitting time point and a receiving time point. The scanning with such a laser beam can be performed by reflecting a beam flux emitted from a laser light source by using a rotating mirror. An object detection device employing the TOF method has already been developed. However, in the object detection device employing the TOF method, in order to detect a weak reflected beam generated at the time of irradiating an object in a distance with a laser beam, generally, a light receiving element having a high amplification ratio such as an avalanche photodiode (APD) is used. In addition, in order to increase resolution of the object to be detected, in some cases, a plurality of light receiving elements which receive the reflected beam are arranged to ensure high resolution.

JP 2015-180956 A discloses a radar device including a rotating mirror unit including first and second mirror planes which are slanted with respect to a rotation axis and a projection system including at least one light source emitting a beam flux toward an object through the mirror unit, wherein the beam flux emitted from the light source is reflected on the first mirror plane of the mirror unit, after that, is propagated toward the second mirror plane, is further reflected on the second mirror plane, and is scan-projected on the object according to rotation of the mirror unit. In the case of using such a mirror unit, the beam flux emitted from the projection system is reflected on the rotating first and second mirror planes, after that, is irradiated toward the object, is reflected on the object, is reflected again on the first and second mirror planes, and after that, is incident on a light receiving system. Therefore, in principle, only the reflected beam of the projected beam is incident on the light receiving system, and thus, there is an advantage in that the device has resistance to disturbance light, has high resolution, and has a wider field of view.

In JP 2015-180956 A, it is disclosed that a plurality of light sources are used, and thus, the number of scan lines can be increased without deterioration in longitudinal distortion.

However, with a configuration disclosed in JP 2015-180956 A, detection range around the rotation axis of the mirror unit is limited.

In contrast, the specification of U.S. Pat. No. 7,969,558 discloses an optical measurement device which rotates a unit where a plurality of light sources and light receiving elements are two-dimensionally arranged to be capable of receiving reflected beams from an object with respect to a laser beam emitted from a light source one by one by using light receiving elements. According to the optical measurement device, object detection can be performed over a range of 360°.

However, in the optical measurement device in the specification of U.S. Pat. No. 7,969,558, due to providing a plurality of light sources and light receiving elements, cost becomes very large, and how the light sources and light receiving elements can be power-supplied and controlled from the outside. For example, if a plurality of the light sources and the light receiving elements are attempted to be power-supplied or communication-controlled from the outside by using a contact type rotary connector or the like, the configuration becomes large, and also noise generation or treatment difficulty occurs. In contrast, in recent years, non-contact type connectors capable of performing wireless power supply by using electromagnetic induction by coils or performing wireless communication by using infrared rays, light, or the like have also been developed. Although it may be considered that these connectors are applied to the technique disclosed in the specification of U.S. Pat. No. 7,969,558, cost may increase, or the configuration may be complicated.

SUMMARY OF THE INVENTION

One or more embodiments of the invention provide an optical scanning type object detection device having a wide detection area exceeding, for example, 180° and being capable of effectively detecting an object invading the detection area with a relatively simple configuration and low cost.

According to an aspect, an optical scanning type object detection device reflecting one aspect of the present invention comprises:

first and second light emitting/receiving units, each of which includes a light source and a light receiving portion; and a mirror unit which rotates around a rotation axis, wherein a beam flux emitted from the light source of the first light emitting/receiving unit is reflected on the mirror unit and is scanned according to rotation of the mirror unit, and a portion of a beam flux scattered by an object in the beam flux emitted from the light source of the first light emitting/receiving unit is reflected on the mirror unit and, after that, is received by the light receiving portion of the first light emitting/receiving unit, and a beam flux emitted from the light source of the second light emitting/receiving unit is reflected on the mirror unit and is scanned according to the rotation of the mirror unit, and a portion of abeam flux scattered by the object in the beam flux emitted from the light source of the second light emitting/receiving unit is reflected on the mirror unit and, after that, is received by the light receiving portion of the second light emitting/receiving unit.

BRIEF DESCRIPTION OF THE DRAWINGS

Advantages and features of the present invention will become more fully understood from the detailed description given hereinbelow and the appended drawings which are given by way of illustration only, and thus are not intended as a definition of the limits of the present invention, and wherein.

DETAILED DESCRIPTION

Hereinafter, embodiments of the present invention will be described with reference to the drawings. However, the scope of the invention is not limited to the illustrated examples.

(First Example)

Figure 1:
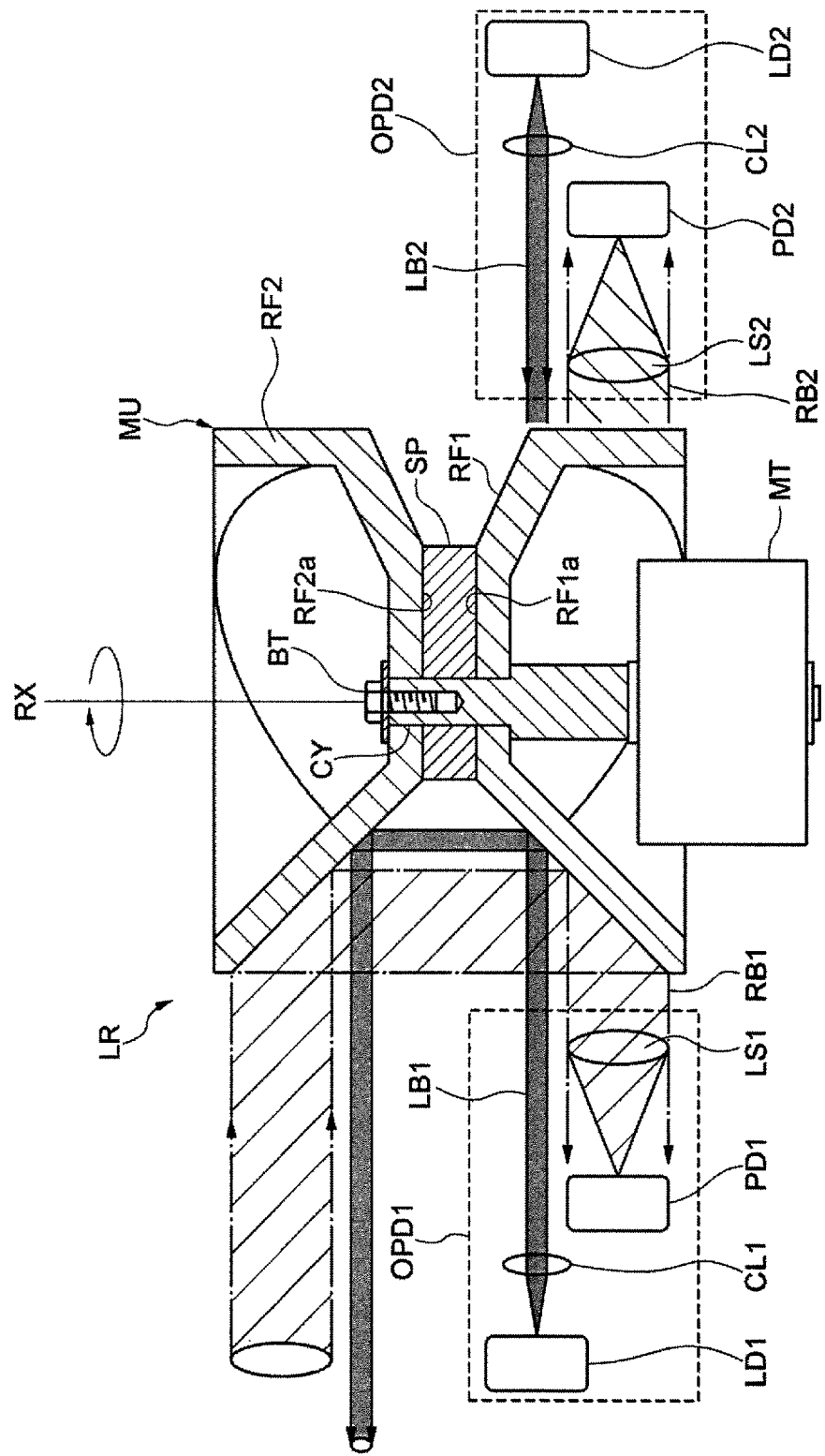
FIG. 1 is a cross-sectional diagram illustrating a laser radar as an optical scanning type object detection device in accordance with one or more embodiments.
Figure 2:
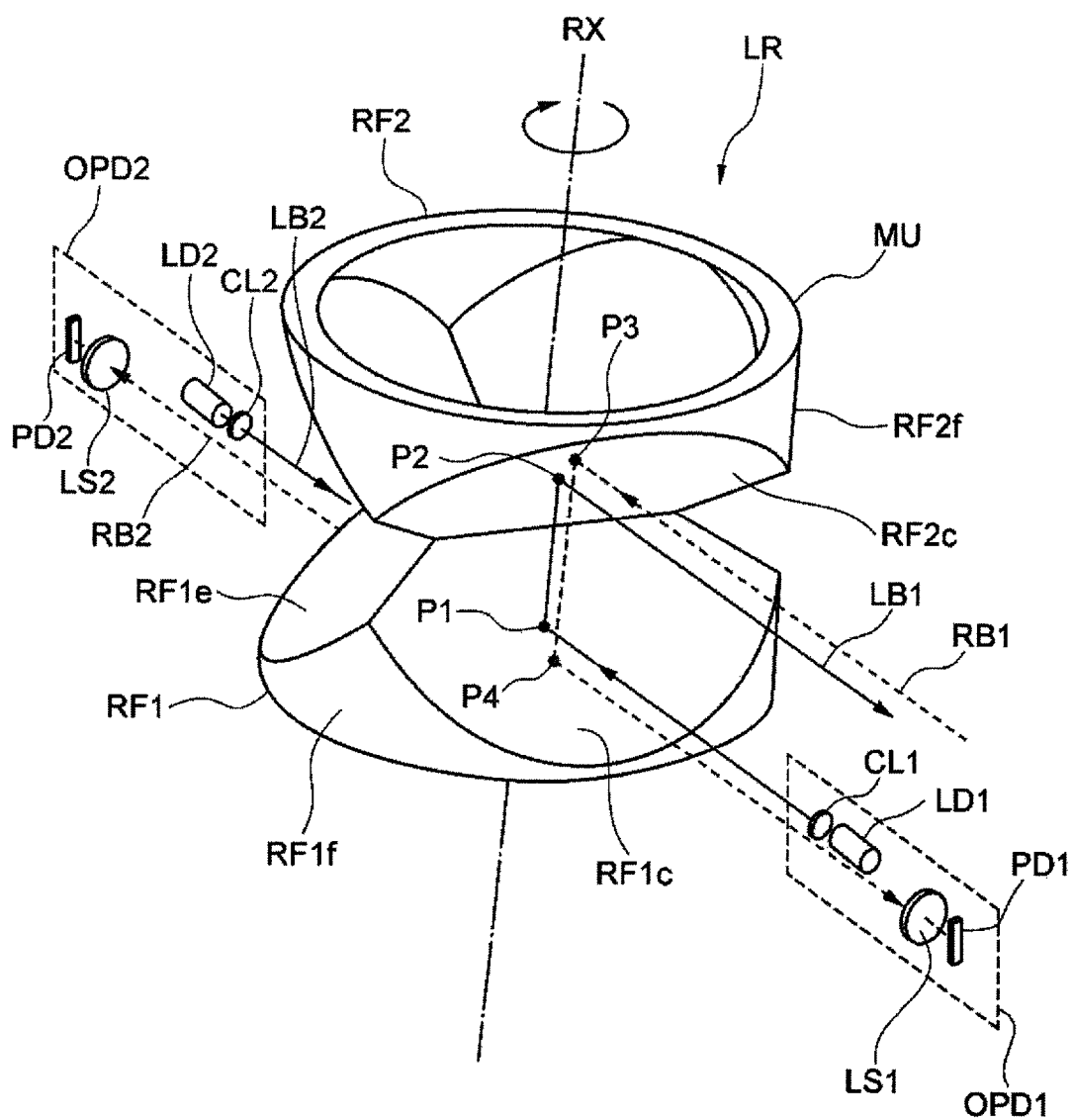
FIG. 2 is a perspective diagram illustrating main components of the laser radar in accordance with one or more embodiments.
Figure 3A:
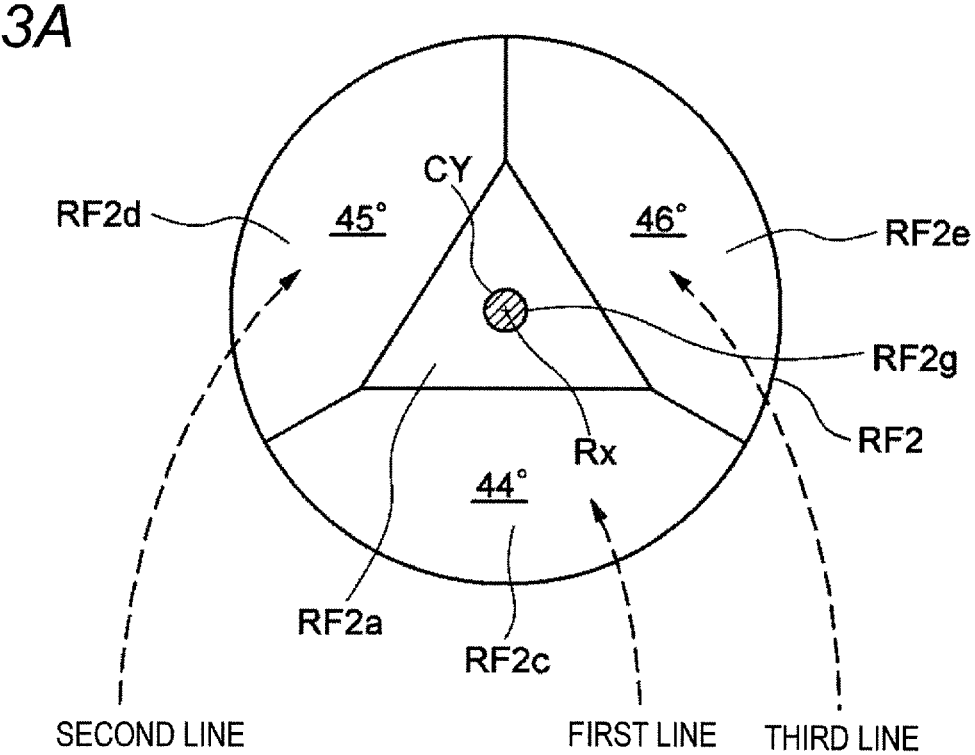
FIG. 3A is a schematic diagram illustrating a second reflecting member constituting a mirror unit as viewed in a direction along a rotation axis.
Figure 3B:
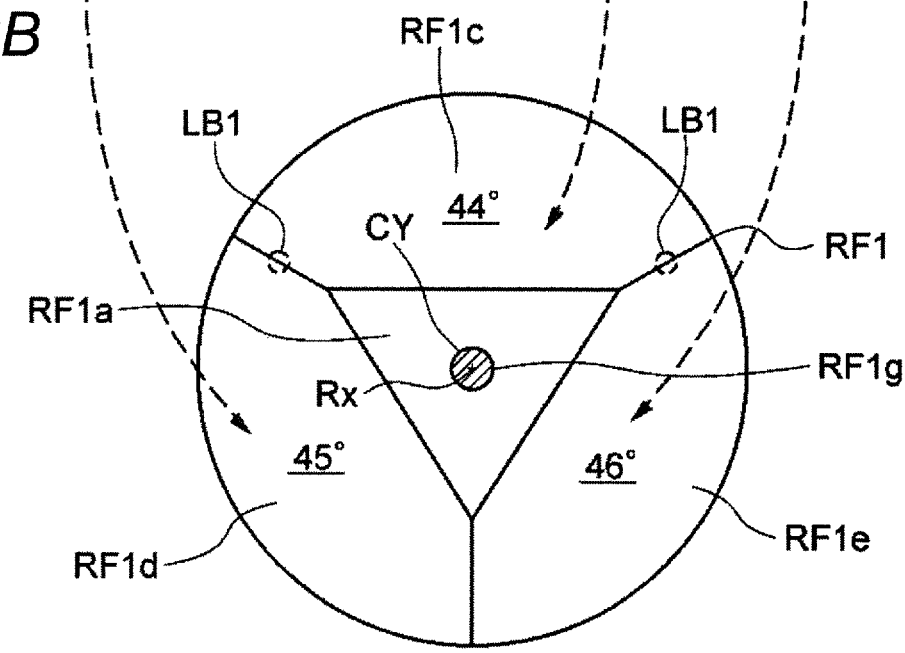
FIG. 3B is a diagram illustrating a first reflecting member constituting the mirror unit as viewed in the direction along the rotation axis.

FIG. 1 is a cross-sectional diagram illustrating a laser radar LR as an optical scanning type object detection device in accordance with one or more embodiments. FIG. 2 is a perspective diagram illustrating main components of the laser radar LR in accordance with one or more embodiments. Herein, laser beams (solid lines) being directed to an object and reflected beams (one-dot dashed lines) from the object are illustrated by only respective optical axes. FIG. 3A is a schematic diagram illustrating a second reflecting member constituting a mirror unit as viewed in a direction along a rotation axis, and FIG. 3B is a diagram illustrating a first reflecting member constituting the mirror unit as viewed in the direction along the rotation axis. Slant angles of the reflection plane with respect to the rotation axis are attached to the respective reflection planes.

Figure 4:
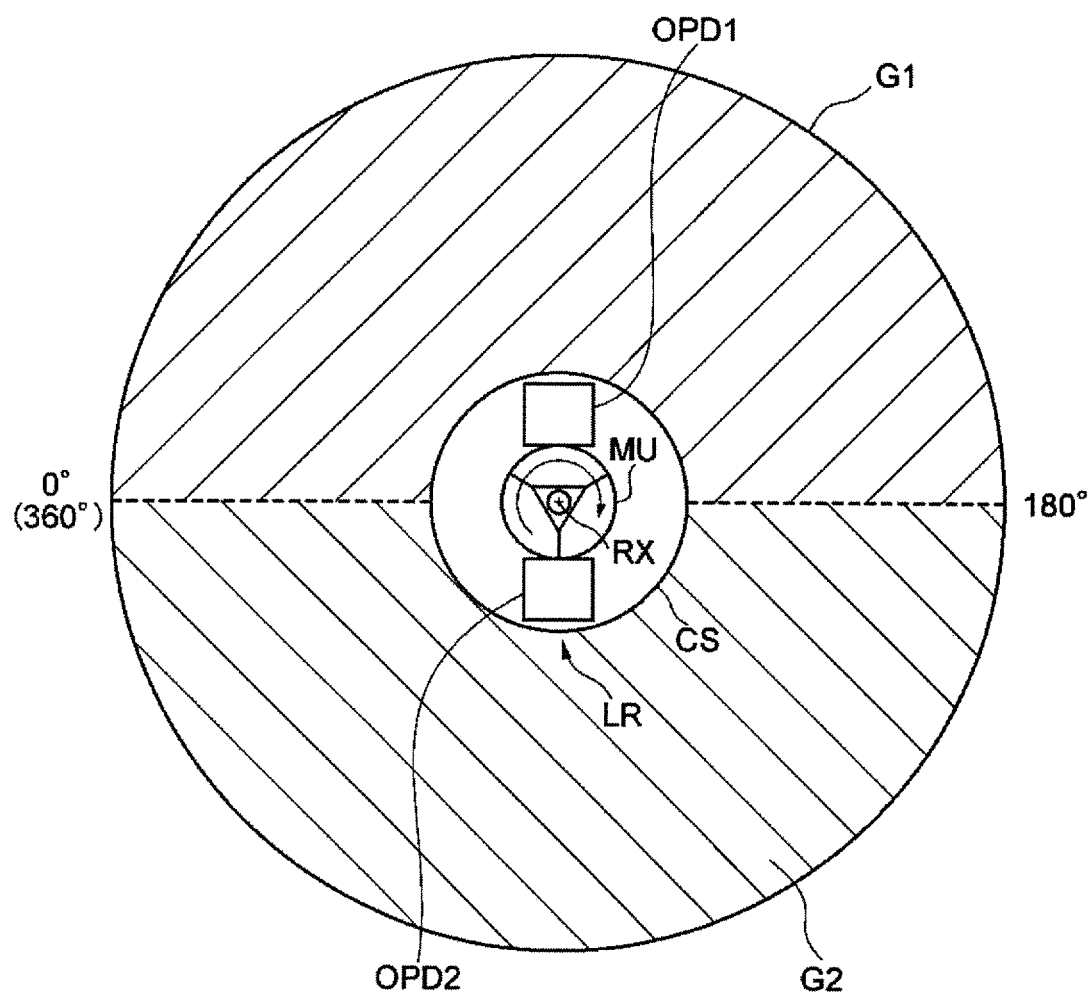
FIG. 4 is a diagram illustrating a scan range as viewed in a direction of a rotation axis of a laser radar.

In FIG. 1, the laser radar LR is configured to include a first light emitting/receiving unit OPD1, also referred to as an optical transceiver, a second light emitting/receiving unit OPD2, and a rotating mirror unit MU, and these units are retained in a case CS (refer to FIG. 4). The first light emitting/receiving unit OPD1 is configured to include a semiconductor laser (light source) LD1 which emits a pulsed laser beam flux LB1, a collimation lens CL1 which collimates the laser beam flux LB1 emitted from the semiconductor laser LD1, a lens LS1 which condenses the reflected beam RB1 from the object, and a photodiode (light receiving portion) PD1 which receives the condensed reflected beam RB1. The second light emitting/receiving unit OPD2 is configured to include a semiconductor laser (light source) LD2 which emits a pulsed laser beam flux LB2, a collimation lens CL2 which collimates the laser beam flux LB2 emitted from the semiconductor laser LD2, a lens LS2 which condenses the reflected beam RB2 from the object, and a photodiode (light receiving portion) PD2 which receives the condensed reflected beam RB2.

The mirror unit MU has a function of reflecting the laser beam flux LB1 emitted from the collimation lens CL1 of the first light emitting/receiving unit OPD1, scanning the object with the laser beam flux through a transparent plate (not illustrated) of the case CS according to rotation, reflecting the reflected beam RB1 returned from the object through the transparent plate, and allowing the reflected beam to be incident on the lens LS1 of the first light emitting/receiving unit OPD1 and a function of reflecting the laser beam flux LB2 emitted from the collimation lens CL2 of the second light emitting/receiving unit OPD2, scanning the object with the laser beam flux through a transparent plate (not illustrated) of the case CS according to the rotation, reflecting the reflected beam RB2 returned from the object through the transparent plate, and allowing the reflected beam to be incident on the lens LS2 of the second light emitting/receiving unit OPD2. Although not illustrated, in one or more embodiments the transparent plate is attached to a window of the case CS and is slanted with respect to the emitted light. As described in detail later, the beam fluxes emitted from the semiconductor lasers LD1 and LD2 in a sub-scan direction (direction perpendicular to a scan direction) are longer than those in the scan direction when the beam fluxes are emitted to the object. In addition, in one or more embodiments the photodiodes PD1 and PD2 include a plurality of light receiving regions arranged in the sub-scan direction. However, the light receiving regions may be two-dimensionally arranged.

The optical axes (herein, centers of cross sections of the laser beam fluxes LB1 and LB2) of the first and second light emitting/receiving units OPD1 and OPD2 are perpendicular to the rotation axis RX of the mirror unit MU. Herein, the optical axes of the first and second light emitting/receiving units OPD1 and OPD2 may be slightly slanted from the perpendicular direction of the rotation axis according to factors such as a device size, shape, and arrangement of optical elements. In addition, in one or more embodiments the optical axes of the first and second light emitting/receiving units OPD1 and OPD2 are arranged with spacing of about 180° around the rotation axis RX. Herein, "about 180°" denotes 180°±5°.

The mirror unit MU is retained in the case CS (refer to FIG. 4) so as to be rotatable around the rotation axis RX which is a shaft and is formed by combining first and second reflecting members RF1 and RF2 as illustrated in FIGS. 2 and 3. Referring to FIG. 3B, the first reflecting member RF1 which is made of a resin and has a shape of a cup with an equal thickness includes, in the outer surface, an equilateral triangular bonding surface RF1a centered at the rotation axis RX, three substantially-fan shaped reflection planes (first mirror planes) RF1c, RF1d, and RF1e intersecting respective sides of the bonding surface RF1a, and a cylindrical outer circumferential surface RF1f (refer to FIG. 2) being in contact with the reflection planes. A central opening RF1g is formed at the center of the bonding surface RF1a.

Referring to FIG. 3A, similarly to the first reflecting member RF1, the second reflecting member RF2 which is made of a resin and has a shape of a cup with an equal thickness includes, in the outer surface, an equilateral triangular bonding surface RF2a centered at the rotation axis RX, three substantially-fan shaped reflection planes (second mirror planes) RF2c, RF2d, and RF2e intersecting respective sides of the bonding surface RF2a, and a cylindrical outer circumferential surface RF2f (refer to FIGS. 3A and 3B) being in contact with the reflection planes. A central opening RF2g is formed at the center of the bonding surface RF2a.

Herein, the slant angle of the reflection plane RF1c with respect to the rotation axis RX is set to 44°, the slant angle of the reflection plane RF1d with respect to the rotation axis RX is set to 45°, and the slant angle of the reflection plane RF1e with respect to the rotation axis RX is set to 46°. On the other hand, the slant angle of the reflection plane RF2c with respect to the rotation axis RX is set to 44°, the slant angle of the reflection plane RF2d with respect to the rotation axis RX is set to 45°, and the slant angle of the reflection plane RF2e with respect to the rotation axis RX is set to 46°.

The first and second reflecting members RF1 and RF2 are formed by injection molding, and a film is formed on the surface by vapor deposition of aluminum, gold, silver, or the like, so that the reflection planes can be obtained. In this manner, in the case where the slant angles of the reflection planes with respect to the rotation axis RX are individually changed, if the reflecting members are formed by injection molding, there is an advantage in that it is easy to obtain the accuracy of each reflection plane.

As illustrated in FIG. 1, the first and second reflecting members RF1 and RF2 can be assembled by facing the bonding surfaces RF1a and RF2a, allowing a triangular-plate-shaped holed spacer SP to be interposed therebetween, inserting and fitting a cylindrical stepped shaft CY into the central openings RF1g and RF2g, and fastening the reflecting members by using a bolt BT. A motor MT which rotationally drives the shaft CY is fixed to the case CS.

As described above, since the first and second reflecting members RF1 and RF2 can be formed by molding with a good accuracy, assembling is performed so that the shafts are coincident with each other by a guide of the shaft CY being inserted into the central openings RF1g and RF2g. In assembling, the reflection plane RF1c and the reflection plane RF2c are allowed to face each other to form a pair, the reflection plane RF1d and the reflection plane RF2d are allowed to face each other to form a pair, and the reflection plane RF1e and the reflection plane RF2e are allowed to face each other to form a pair, so that a phase in the rotation direction is set. Irrespective of the manufacturing method described above, the first and second reflecting members RF1 and RF2 may be formed integrally.

Figure 5:
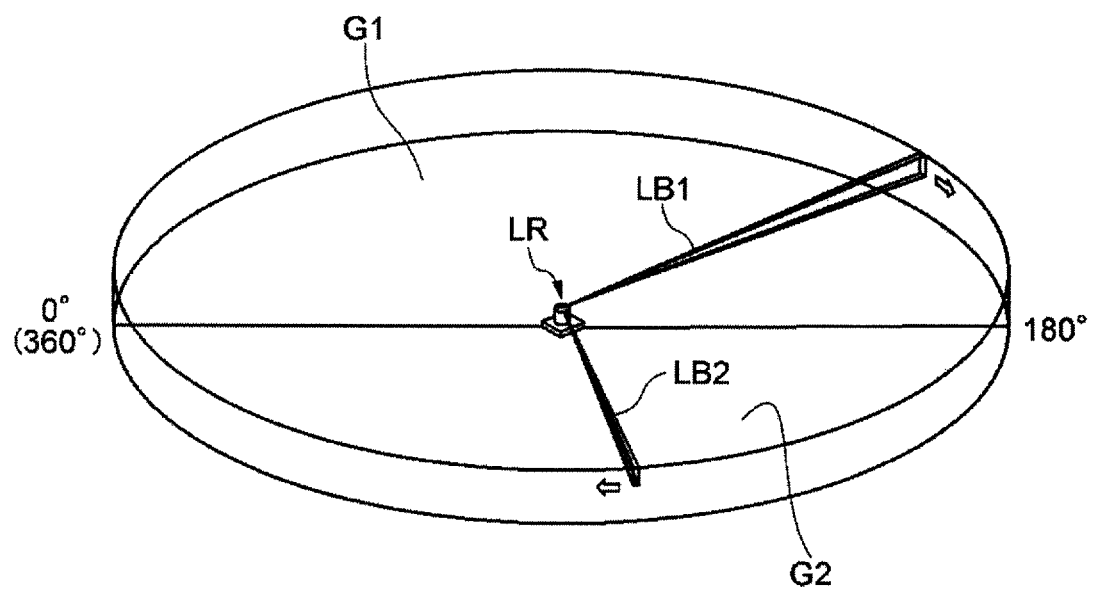
FIG. 5 is a schematic perspective diagram illustrating an object detection range which can be detected by the laser radar.
Figure 6:
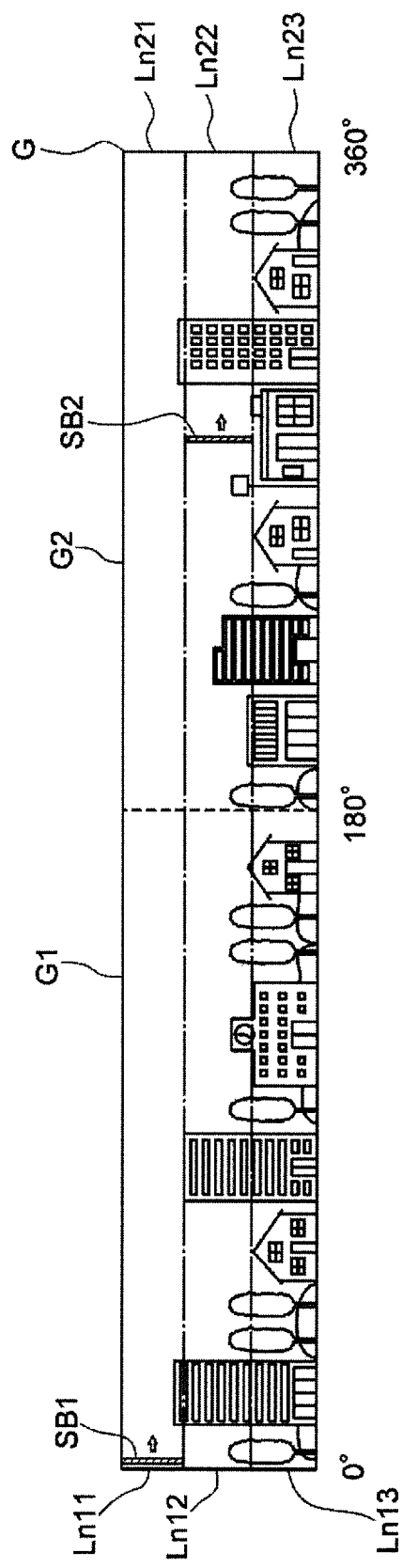
FIG. 6 is a developed view illustrating a scan range of a spot beam emitted from the laser radar.

Next, a distance measurement operation of the laser radar LR will be described. FIG. 4 is a diagram illustrating a scan range as viewed in the direction of the rotation axis of the laser radar LR. A lower half portion of the mirror unit MU is illustrated, and the light emitting/receiving units OPD1 and OPD2 are illustrated in brief. Object detection ranges (G1 and G2) are schematically indicated by hatching. Actual detection limit with respect to the size of the case CS of the laser radar LR is larger than the illustrated limit. FIG. 5 is a schematic perspective diagram illustrating the object detection range which can be detected by the laser radar LR. FIG. 6 is a developed view illustrating a scan range of the spot beam SB emitted from the laser radar LR and illustrating objects such as buildings. In FIG. 2, in the state where the mirror unit MU is rotated at a constant speed by driving from a driving source (not illustrated), a pulsed laser beam flux intermittently emitted from the semiconductor laser LD1 of the first light emitting/receiving unit OPD1 is incident on a point P1 of the reflection plane RF1c of the first reflecting member RF1, is reflected on the point, is propagated along the rotation axis RX or with a predetermined angle slanted from the rotation axis RX, is reflected on a point P2 of the reflection plane RF2c of the second reflecting member RF2, and is scan-projected on the object side. At this time, the reflection planes at the points P1 and P2 are moved in the circumferential direction according to the rotation of the mirror unit MU. According to the rotation of the mirror unit MU, the reflection planes are moved relative to the reflection planes RF1d and RF2d, and according to the rotation of the mirror unit MU, the reflection planes are moved relative to the reflection planes RF1e and RF2e.

Similarly, a pulsed laser beam flux intermittently emitted from the semiconductor laser LD2 of the second light emitting/receiving unit OPD2 is incident on the directly-facing reflection plane of the first reflecting member RF1 according to the rotation of the mirror unit MU, is reflected on the reflection plane, is propagated along the rotation axis RX or with a predetermined angle slanted from the rotation axis RX, is reflected on a reflection plane of the second reflecting member RF2, and is scan-projected on the object side.

In FIG. 6, a spot beam from the laser beam flux LB1 with which the object is irradiated is denoted by SB1, and a spot beam from the laser beam flux LB2 with which the object is irradiated is denoted by SB2. The detection range G of the laser radar LR is scanned in the horizontal direction with the spot beams SB1 and SB2 according to the rotation of the mirror unit MU. A first range G1 from 0° to 180° in the detection range G is scanned with the spot beam SB1, and a second range G2 from 180° to 360° in the detection range G is scanned with the spot beam SB2.

Herein, as described above, the reflection planes of the mirror unit MU are different in slant angle with respect to the rotation axis RX. The top region Ln11 of the first range G1 is scanned from the left to the right in the horizontal direction according to the rotation of the mirror unit MU with the spot beam SB1, that is, a laser beam which is emitted from the first light emitting/receiving unit OPD1 and is reflected on a pair of the reflection planes RF1$c$ and RF2$c$. Next, the second region Ln12 from the top of the first range G1 is scanned from the left to the right in the horizontal direction according to the rotation of the mirror unit MU with the spot beam SB1, that is, a laser beam which is reflected on a pair of the reflection planes RF1$d$ and RF2$d$. Next, the third region Ln13 from the top of the first range G1 is scanned from the left to the right in the horizontal direction according to the rotation of the mirror unit MU with the spot beam SB1, that is, a laser beam which is reflected on a pair of the reflection planes RF1$e$ and RF2$e$.

With scan timing shifted from the above scan timing, the top region Ln21 of the second range G2 is scanned from the left to the right in the horizontal direction according to the rotation of the mirror unit MU with the spot beam SB2, that is, a laser beam which is emitted from the second light emitting/receiving unit OPD2 and is reflected on a pair of the reflection planes RF1$c$ and RF2$c$. Next, the second region Ln22 from the second range G2 is scanned from the left to the right in the horizontal direction according to the rotation of the mirror unit MU with the spot beam SB2, that is, a laser beam which is reflected on a pair of the reflection planes RF1$d$ and RF2$d$. Next, the third region Ln23 from the top of the second range G2 is scanned from the left to the right in the horizontal direction according to the rotation of the mirror unit MU with the spot beam SB2, that is, a laser beam which is reflected on a pair of the reflection planes RF1$e$ and RF2$e$.

Namely, by one rotation of the mirror unit MU, scanning of the entire detection range G is completed. After that, when a pair of the reflection planes RF1$c$ and RF2$c$ is returned, scanning from the top of the detection range G is repeated again. When one of the semiconductor lasers LD1 and LD2 which emit pulsed light is allowed to emit light, if the other semiconductor laser is allowed to stop emitting light, influence of stray light can be avoided.

As apparent from arrangement relationships illustrated in FIGS. 3A, 3B, and 4, in the case where the laser beam flux LB1 emitted from the first light emitting/receiving unit OPD1 is incident on the center of the reflection plane RF1$c$, the laser beam flux LB2 emitted from the second light emitting/receiving unit OPD2 starts to be incident on the reflection plane RF1$e$. Namely, the laser beam fluxes LB1 and LB2 are emitted from the mirror unit MU while being shifted from each other by 90° as viewed in the direction of the rotation axis (refer to FIG. 5).

In FIG. 2, a portion of a scattered beam reflected on the object which is irradiated with the spot beam SB1 becomes a reflected beam RB1 and, again, is incident on the reflection plane RF2$c$ and the like of the second reflecting member RF2, is reflected on the reflection plane and the like, is propagated along the rotation axis RX or with a predetermined angle slanted from the rotation axis RX, is reflected on the reflection plane RF1$c$ and the like of the first reflecting member RF1, is condensed by the lens LS1, and is detected on the light receiving plane of the photodiode PD1. On the other hand, a portion of a scattered beam reflected on the object which is irradiated with the spot beam SB2 becomes a reflected beam RB2 and, again, is incident on the reflection plane RF2$c$ and the like of the second reflecting member RF2, is reflected on the reflection plane and the like, is propagated along the rotation axis RX or with a predetermined angle slanted from the rotation axis RX, is reflected on the reflection plane RF1$c$ and the like of the first reflecting member RF1, is condensed by the lens LS2, and is detected on the light receiving plane of the photodiode PD2. Accordingly, as illustrated in FIGS. 4 to 6, the object detection over the range of 360° around the laser radar LR can be performed. At this time, the angle of the rotation of the mirror unit MU can be obtained on the basis of the emitting time points of the laser beam fluxes LB1 and LB2, and the distance to the object can be obtained from a difference between the emitting time points of the laser beam fluxes LB1 and LB2 and the receiving time points of the reflected beams RB1 and RB2 which are reflected from the object. Therefore, the position of the object from the laser radar LR as a reference can be calculated at a good accuracy.

When the laser beam flux is incident on the three rotating reflection planes, theoretically, the scan angle of the laser beam flux scanned from one reflection plane becomes 240°. Although the laser beam fluxes LB1 and LB2 incident on the reflection planes of the mirror unit MU need to have some degrees of widths in order to increase detection efficiency, the scan angle of 240° cannot be fully secured for the reason. More specifically, for example, as indicated by dotted lines in FIGS. 3A and 3B, if the edge in the circumferential direction of the reflection plane RF1$c$ is irradiated with the laser beam flux LB1, a portion of the laser beam flux LB1 is reflected on the reflection plane RF1$c$, but the other portion of the laser beam flux LB1 is reflected on the reflection plane RF1$d$ or RF1$e$ adjacent to the reflection plane.

In this case, the reflected beam from the object by the laser beam flux LB1 reflected on the reflection plane RF1$c$ is appropriately received by the photodiode PD1. However, the reflected beam from the object by the laser beam flux LB1 reflected on the portion other than the reflection plane RF1$c$ is not received by the photodiode PD1, and in some case, the reflected beam is detected by the photodiode PD2 of the second light emitting/receiving unit OPD2, so that error may be detected due the reflected beam. The same error may occur in other reflection planes.

In order to avoid such error detection, a control unit (not illustrated) controlling the semiconductor laser LD1 detects the rotation angle of the mirror unit MU and allows the semiconductor laser LD1 to stop emitting light before the laser beam flux LB1 is applied to the edge in the circumferential direction of each reflection plane. The same control is performed on the semiconductor laser LD2. However, if such control of light emitting of the semiconductor laser is performed, the scan angle of the laser beam flux cannot be fully used. According to the studies performed by the inventors or the like, it can be understood that, when the laser beam flux is incident on the three rotating reflection planes, the scan angle of the laser beam flux scanned from one reflection plane becomes at least 180°. Therefore, if the two light emitting/receiving units are used for the mirror unit MU including the three reflection planes aligned in the circumferential direction, the object detection can be performed over the entire circumference of 360°. The example will be described later.

Figure 7A:
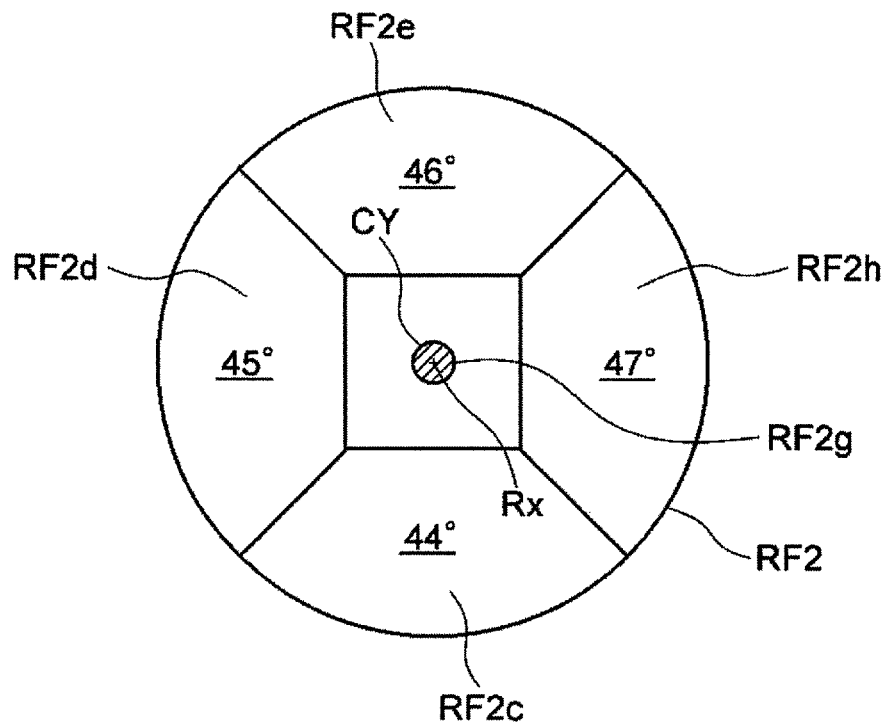
FIGS. 7A and 7B are diagrams according to a modified example in accordance with one or more embodiments which are similar to FIGS. 3A and 3B.
Figure 7B:
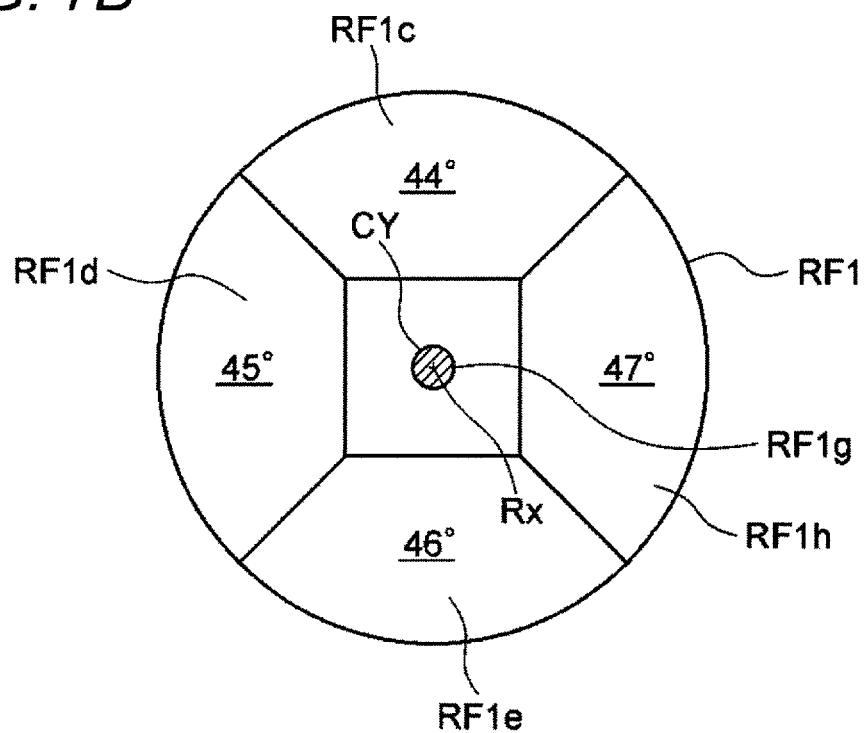
Figure 8:
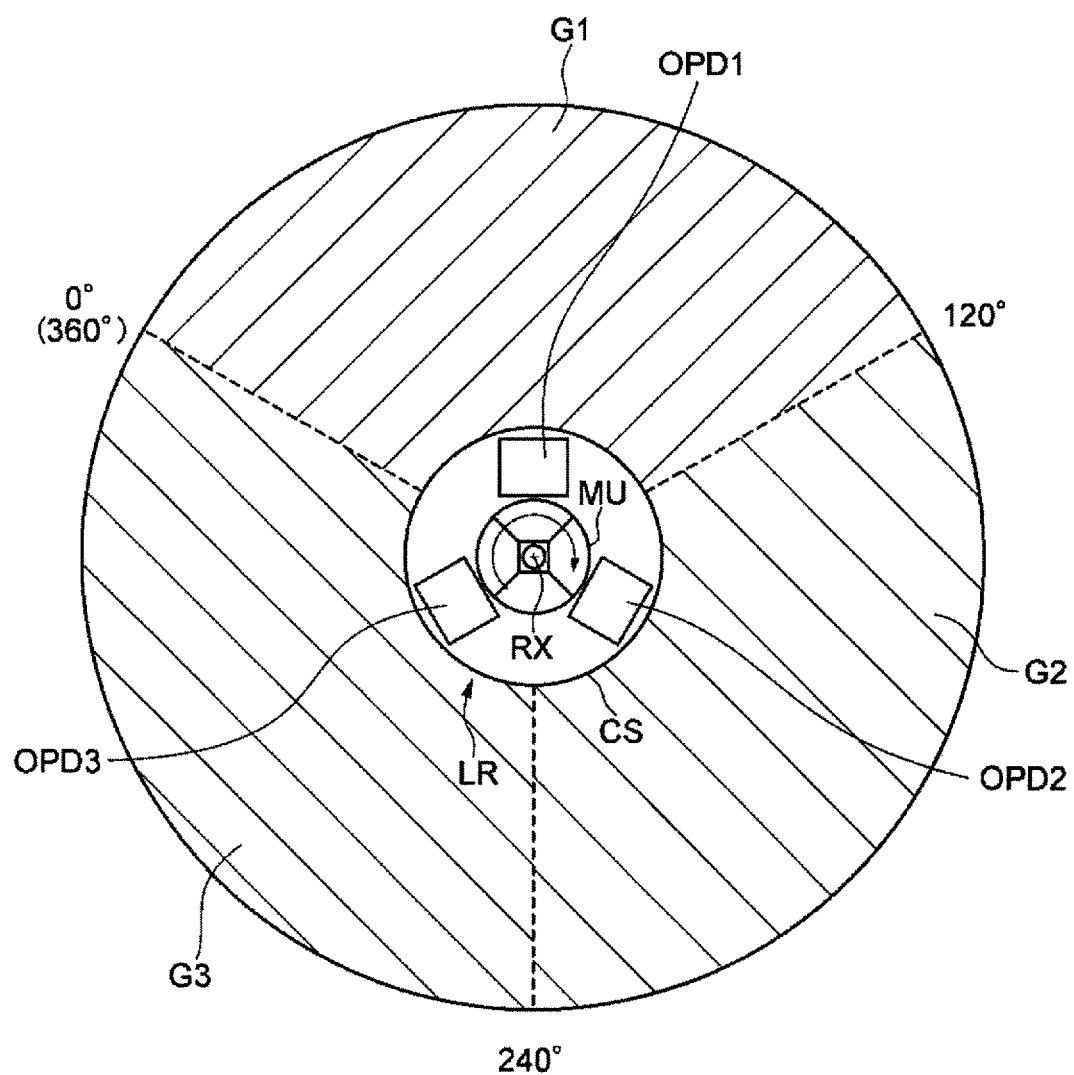
FIG. 8 is a diagram according to a modified example in accordance with one or more embodiments which is similar to FIG. 4.

FIGS. 7A and 7B are diagrams in accordance with one or more embodiments which are similar to FIGS. 3A and 3B, and FIG. 8 is a diagram illustrating an example in accordance with one or more embodiments which is similar to FIG. 4. Points different from those of the above-described embodiments will be mainly described. A laser radar LR according to the modified example is configured to include three light emitting/receiving units OPD1, OPD2, and OPD3 and one mirror unit MU. Each of the light emitting/receiving units OPD1, OPD2, and OPD3 has the configuration similar to that of the above-described embodiments, but as illustrated in FIG. 8, the light emitting/receiving units are arranged with spacing of about 120° around the rotation axis RX. Herein, "about 120°" denotes 120°±5°.

On the other hand, the mirror unit MU according to the modified example is configured to include four pairs of reflection planes. Specifically, referring to FIG. 7B, the first reflecting member RF1 is configured to include four reflection planes (first mirror planes) RF1c, RF1d, RF1e, and RF1h arranged in the circumferential direction. Referring to FIG. 7A, the second reflecting member RF2 is configured to include four reflection planes (second mirror planes) RF2c, RF2d, RF2e, and RF2h arranged in the circumferential direction to face the above-described reflection planes.

Herein, the slant angle of the reflection plane RF1c with respect to the rotation axis RX is set to 44°, the slant angle of the reflection plane RF1d with respect to the rotation axis RX is set to 45°, the slant angle of the reflection plane RF1e with respect to the rotation axis RX is set to 46°, and the slant angle of the reflection plane RF1h with respect to the rotation axis RX is set to 47°. On the other hand, the slant angle of the reflection plane RF2c with respect to the rotation axis RX is set to 44°, the slant angle of the reflection plane RF2d with respect to the rotation axis RX is set to 45°, the slant angle of the reflection plane RF2e with respect to the rotation axis RX is set to 46°, and the slant angle of the reflection plane RF2h with respect to the rotation axis RX is set to 47°.

In the modified example, the reflection planes of the mirror unit MU are different in slant angle with respect to the rotation axis RX. Therefore, the top regions of the ranges G1 to G3 in the vertical direction thereof (direction perpendicular to the paper surface in FIG. 8) are scanned from the left to the right in the horizontal direction according to the rotation of the mirror unit MU with the spot beams (not illustrated), that is, laser beams which are emitted from the light emitting/receiving units OPD1 to OPD3 and are reflected on a pair of the reflection planes RF1c and RF2c. Next, the second regions from the tops of the ranges G1 to G3 in the vertical direction are scanned from the left to the right in the horizontal direction according to the rotation of the mirror unit MU with the spot beams, that is, laser beams which are reflected on a pair of the reflection planes RF1d and RF2d. Next, the third regions from the tops of the ranges G1 to G3 in the vertical direction are scanned from the left to the right in the horizontal direction according to the rotation of the mirror unit MU with the spot beams SB1, that is, laser beams which are reflected on a pair of the reflection planes RF1e and RF2e. Next, the fourth regions from the tops of the ranges G1 to G3 in the vertical direction are scanned from the left to the right in the horizontal direction according to the rotation of the mirror unit MU with the spot beams, that is, laser beams which are reflected on a pair of the reflection planes RF1h and RF2h. Accordingly, the object detection can be performed over the range of 360° around the laser radar LR.

Herein, when the laser beam flux is incident on the four rotating reflection planes, theoretically, the scan angle of the laser beam flux scanned from the one reflection plane becomes 180°, but the scan angle of 180° cannot be fully secured for the above-described reason. According to the studies performed by the inventors or the like, it can be understood that, when the laser beam flux is incident on the four rotating reflection planes, the scan angle of the laser beam flux scanned from one reflection plane becomes at least 90°. Therefore, if the three light emitting/receiving units are used for the mirror unit MU including the four reflection planes aligned in the circumferential direction, the object detection can be performed over the entire circumference of 360°. The example will be described later.

EXAMPLE 1

Figure 9:
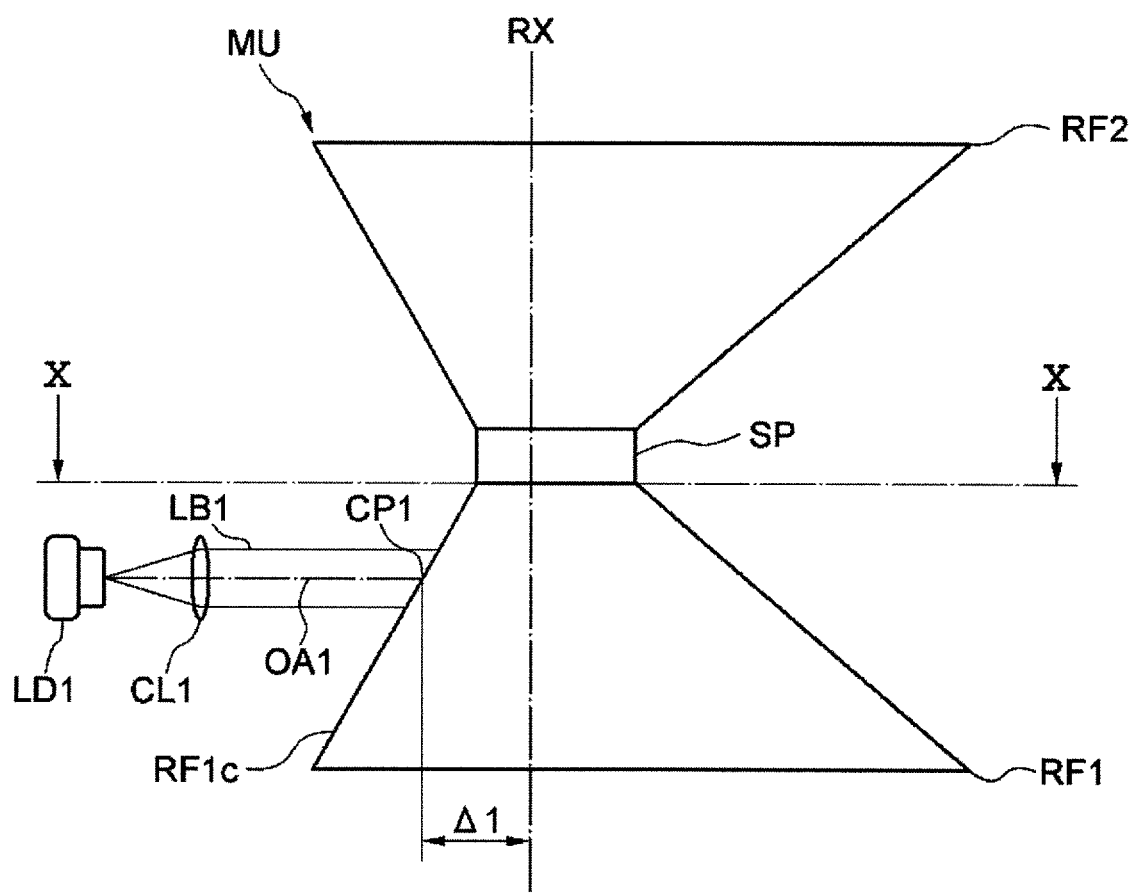
FIG. 9 is a side view of Example 1 illustrating only a mirror unit, a semiconductor laser, and a collimation lens corresponding to the examples shown in FIGS. 1 to 6.
Figure 10:
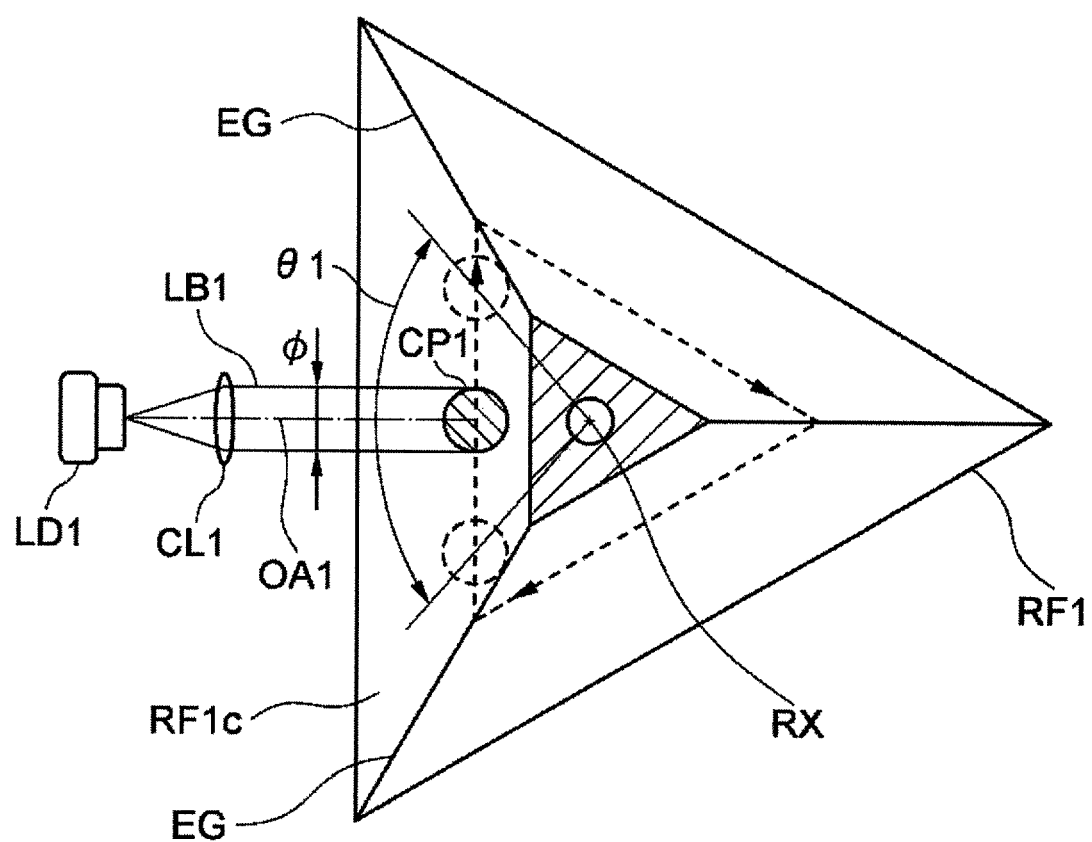
FIG. 10 is a diagram illustrating a configuration of FIG. 9 cut along line X-X as viewed in an arrow direction.

FIG. 9 is a side view of Example 1 illustrating only a mirror unit MU, a semiconductor laser LD1, and a collimation lens CL1 corresponding to the embodiments of FIGS. 1 to 6, and FIG. 10 is a diagram of a configuration of FIG. 9 cut along line X-X as viewed in the arrow direction. In the mirror unit MU, portions other than the reflection planes are mainly omitted.

In Example 1, the beam spread angle of the laser beam flux LB1 emitted from the semiconductor laser LD1 is 28° (full width at half maximum), and the laser beam flux is allowed to pass through the collimation lens CL1 with a focal length of f=6 mm to be converted into a substantially parallel beam with a beam diameter of φ=5.5 mm (when the intensity at the center is 100%, a diameter at a position where the intensity is 95%). The parallel beam is incident on the reflection plane RF1c of the mirror unit MU along the direction perpendicular to the rotation axis RX. At this time, the incident position is set to the position where the distance Δ1 between the intersection point CP1 of the optical axis OA1 and the reflection plane RF1c and the rotation axis RX is 8 mm at the rotation position of the mirror unit MU (refer to FIG. 10) where a virtual plane formed by the rotation axis RX and the center line of the reflection plane RF1c overlaps with the optical axis OA1 of the laser beam flux LB1.

If the mirror unit MU is rotated around the rotation axis RX, the intersection point CP1 is moved on the reflection plane in the circumferential direction according to the rotation angle as indicated by the dotted line. However, the laser beam flux LB1 reflected within the reflection plane RF1c can be effectively used in a range with a maximum allowable angle θ1 (between the positions indicated by the dotted lines) which does not fall on the edge EG of the reflection plane RF1c in the circumferential direction. According to Example 1 in accordance with the above-described specification, the allowable angle is θ1=100°. Therefore, since the oscillating width of the laser beam flux LB1 becomes 100°×2=200°, if the two light emitting/receiving units are provided, a total object detection range of 400° can be covered. In this case, since the surplus (400°−360°)=40° exceeding the entire circumference can be used as a margin of the detection range, redundancy or the like in the manufacturing period is heightened.

EXAMPLE 2

Figure 11:
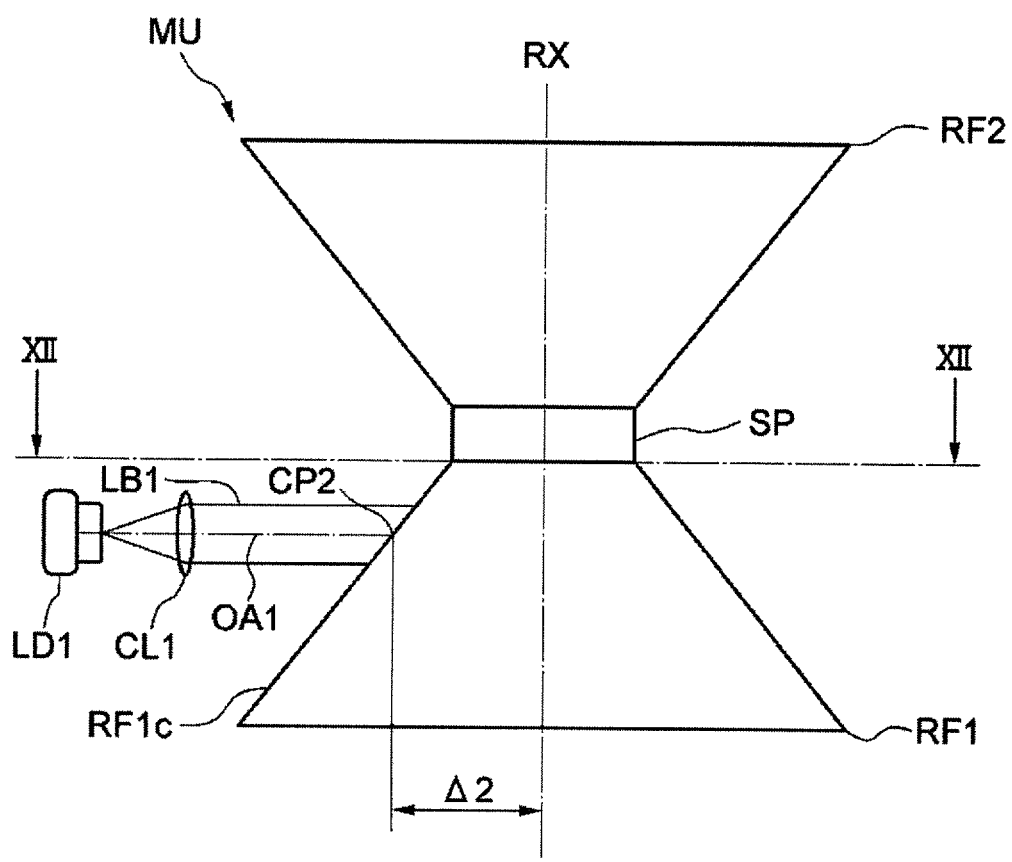
FIG. 11 is a side view of Example 2 illustrating only a mirror unit, a semiconductor laser, and a collimation lens corresponding to examples shown in FIGS. 7A, 7B, and 8.
Figure 12:
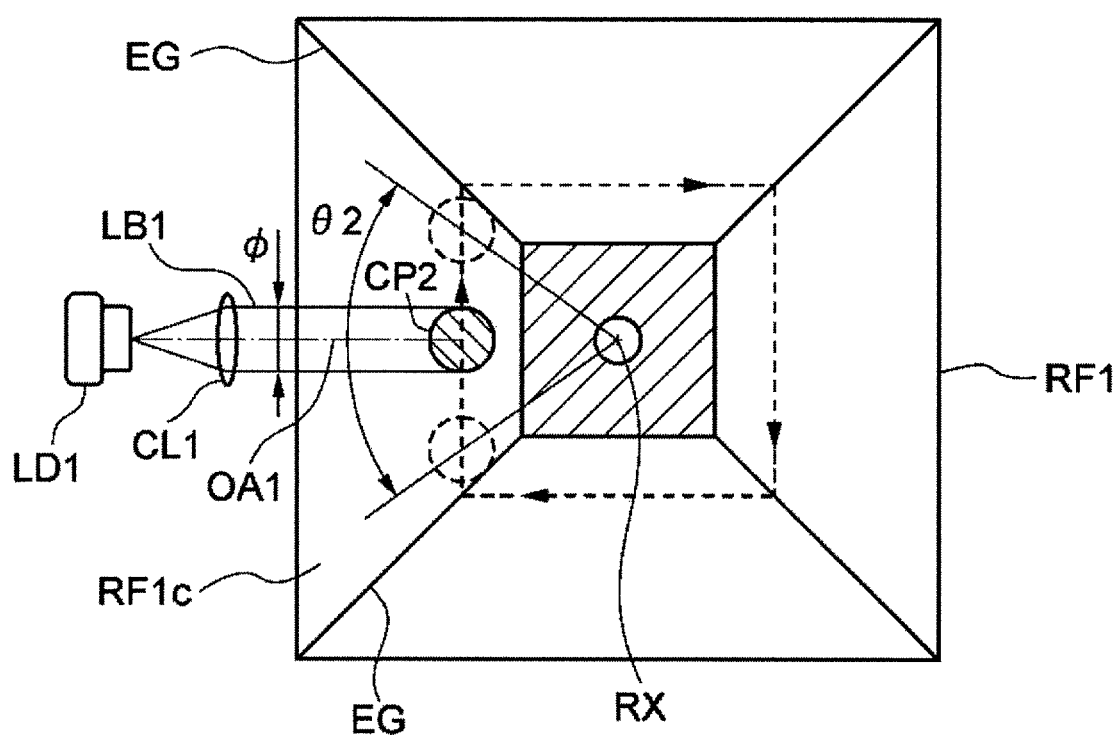
FIG. 12 is a diagram illustrating a configuration of FIG. 11 cut along line XII-XII as viewed in an arrow direction.

FIG. 11 is a side view of Example 2 illustrating only a mirror unit MU, a semiconductor laser LD1, and a collimation lens CL1 corresponding to the embodiments of FIGS. 7A, 7B, and 8, and FIG. 12 is a diagram illustrating a configuration of FIG. 11 cut along line XII-XII as viewed in an arrow direction. In the mirror unit MU, mainly reflection planes are illustrated, and other components are omitted.

In Example 2, the beam spread angle of the laser beam flux LB1 emitted from the semiconductor laser LD1 is 28° (full width at half maximum), and the laser beam flux is allowed to pass through the collimation lens CL1 with a focal length of f=6 mm to be converted into a substantially parallel beam with a beam diameter of ϕ=5.5 mm (when the intensity at the center is 100%, a diameter at a position where the intensity is 95%). The parallel beam is incident on the reflection plane RF1c of the mirror unit MU along the direction perpendicular to the rotation axis RX. At this time, the incident position is set to the position where the distance Δ2 between the intersection point CP2 of the optical axis OA1 and the reflection plane RF1c and the rotation axis RX is 8 mm at the rotation position of the mirror unit MU (refer to FIG. 10) where a virtual plane formed by the rotation axis RX and the center line of the reflection plane RF1c overlaps with the optical axis OA1 of the laser beam flux LB1.

If the mirror unit MU is rotated around the rotation axis RX, the intersection point CP2 is moved on the reflection plane in the circumferential direction according to the rotation angle as indicated by the dotted line. However, the laser beam flux LB1 reflected within the reflection plane RF1c can be effectively used in a range with a maximum allowable angle θ2 (between the positions indicated by the dotted lines) which does not fall on the edge EG of the reflection plane RF1c in the circumferential direction. According to Example 2 in accordance with the above-described specification, the allowable angle is θ2=70°. Therefore, since the oscillating width of the laser beam flux LB1 becomes 70°×2=140°, if the three light emitting/receiving units are provided, a total object detection range of 420° can be covered. In this case, since the surplus (420°−360°)=60° exceeding the entire circumference can be used as a margin of the detection range, redundancy or the like in the manufacturing period is heightened.

Figure 13A:
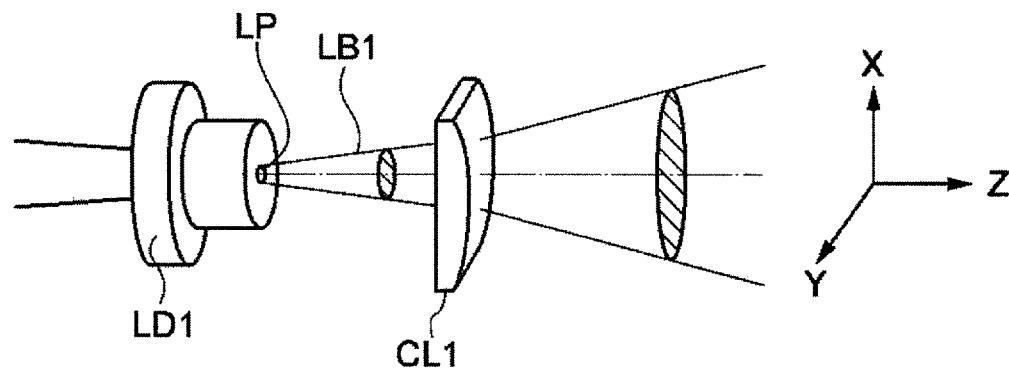
FIGS. 13A to 13C are perspective diagrams illustrating various examples of the semiconductor laser and the collimation lens which can be used in one or more embodiments.
Figure 13B:
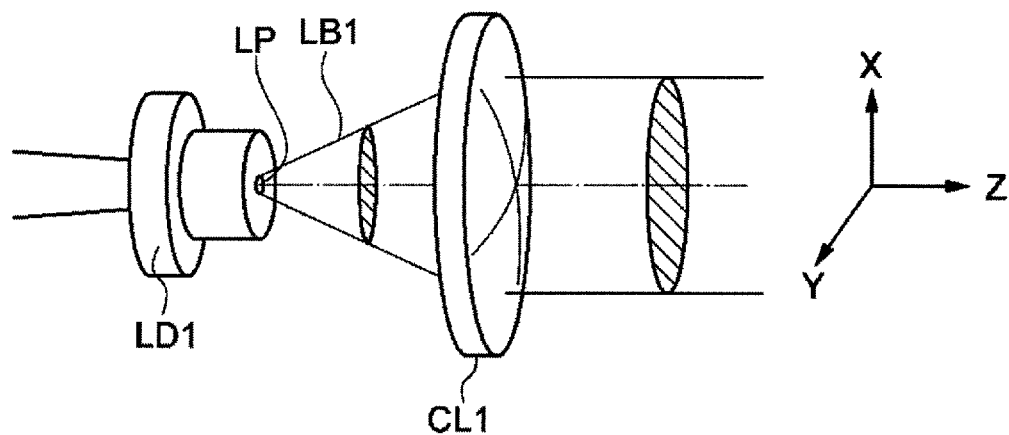
Figure 13C:
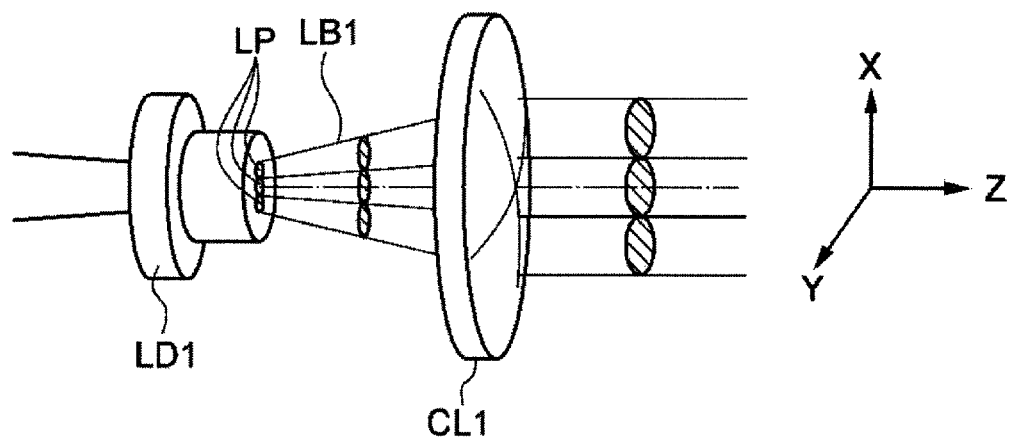

FIGS. 13A to 13C are perspective diagrams illustrating various examples of the semiconductor laser LD1 and the collimation lens CL1 which can be used in the above-described embodiments. Cross sections of emitted laser beams are indicated by hatching. In the figure, the Z direction is set to the optical axis direction, the Y direction is set to the direction corresponding to the scan direction, and the X direction is set to the direction corresponding to the sub-scan direction. In the example illustrated in FIG. 13A, a laser beam flux LB1 having a substantially circular cross section is emitted from a light emitting portion LP of the semiconductor laser LD1. The laser beam flux LB1 is shaped by a cylindrical lens CL1, and a mirror unit MU (not illustrated) is irradiated with the laser beam flux. The cylindrical lens CL1 shapes the cross section of the transmitting laser beam flux LB1 so that the dimension in the Y direction is not changed but the dimension in the X direction is extended. Accordingly, in the shape of the cross section of the laser beam flux LB1 scan-projected to the object, the dimension in the sub-scan direction becomes larger than the dimension in the scan direction.

In the example illustrated in FIG. 13B, a laser beam flux LB1 having a substantially elliptical cross section where the Y direction is set to the minor axis and the X direction is set to the major axis is emitted from the light emitting portion LP of the semiconductor laser LD1. The laser beam flux LB1 is converted into a substantially parallel beam flux by the collimation lens CL1, and a mirror unit MU (not illustrated) is irradiated with the laser beam flux. Therefore, with respect to a shape of the cross section of the laser, beam flux LB1 which is scan-projected toward the object, a dimension in the sub-scan direction is larger than a dimension in the scan direction.

In the example illustrated in FIG. 13C, three light emitting portions LP are provided to the semiconductor laser LD1 to be aligned in the X direction, and a laser beam flux LB1 having a substantially circular cross section is emitted from each light emitting portion LP. The three laser beam flux LB1 is converted into substantially parallel beam flux by the collimation lens CL1, and the mirror unit MU (not illustrated) is irradiated with the laser beam flux in the state that the laser beam flux is in contact with each other without gap. When the laser beam flux LB1 aligned in the X direction without gap is scan-projected toward the object, a dimension in the sub-scan direction is larger than a dimension in the scan direction. With respect to the semiconductor laser LD2 and the collimation lens CL2, the above-described configuration may be used.

(Second Example)

Figure 14:
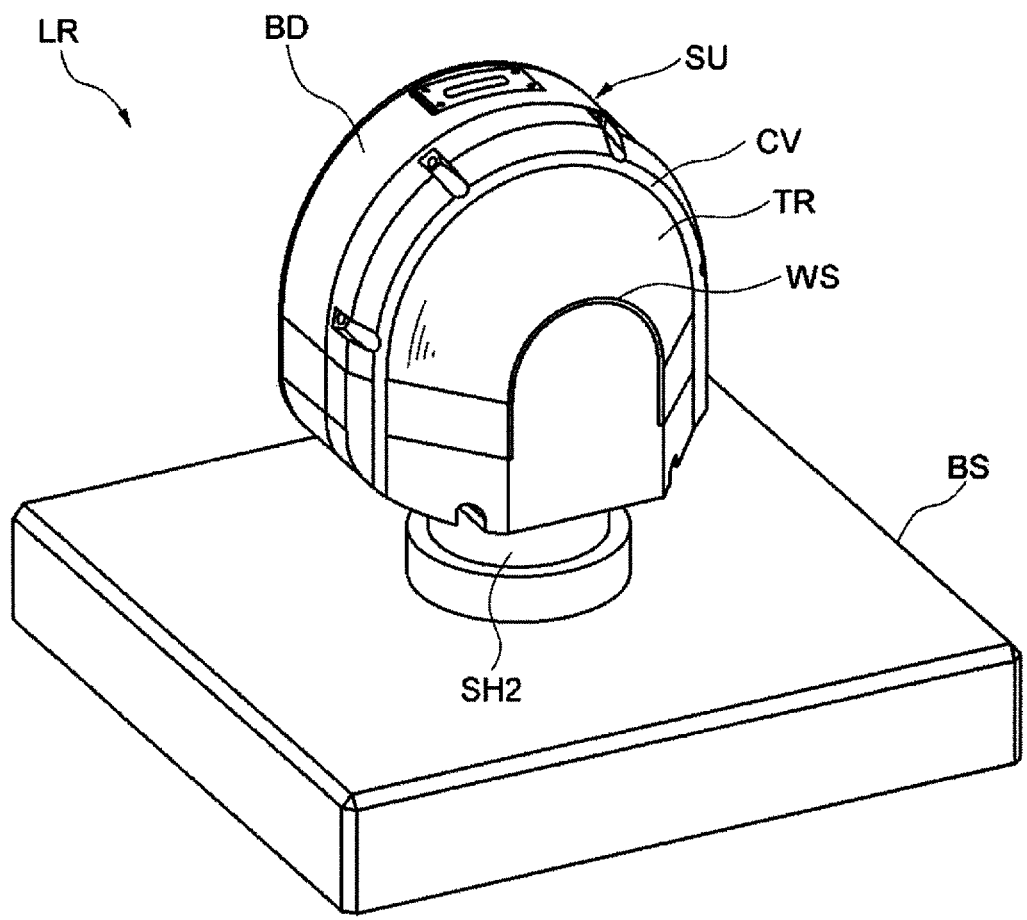
FIG. 14 is a perspective diagram illustrating a laser radar as an optical scanning type object detection device in accordance with one or more embodiments.
Figure 15:
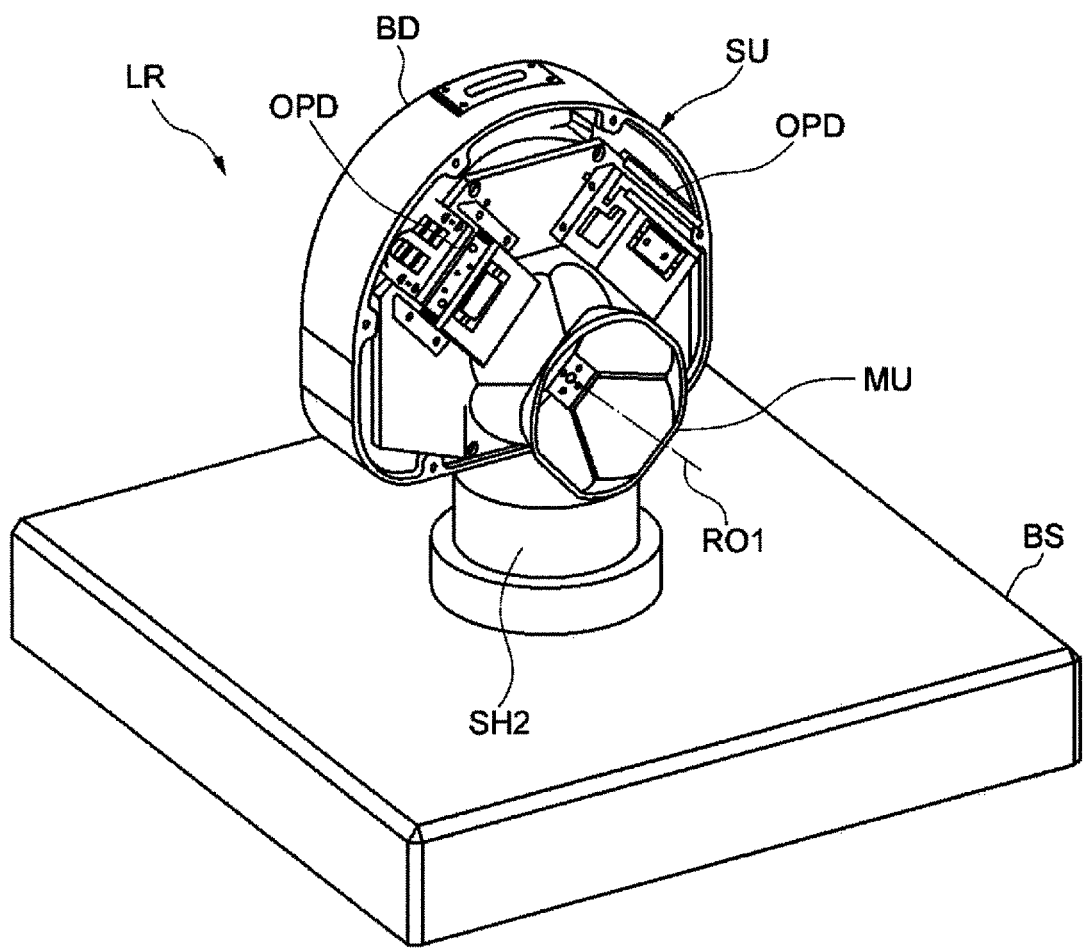
FIG. 15 is a perspective diagram illustrating a state that a cover is detached from the laser radar.
Figure 16:
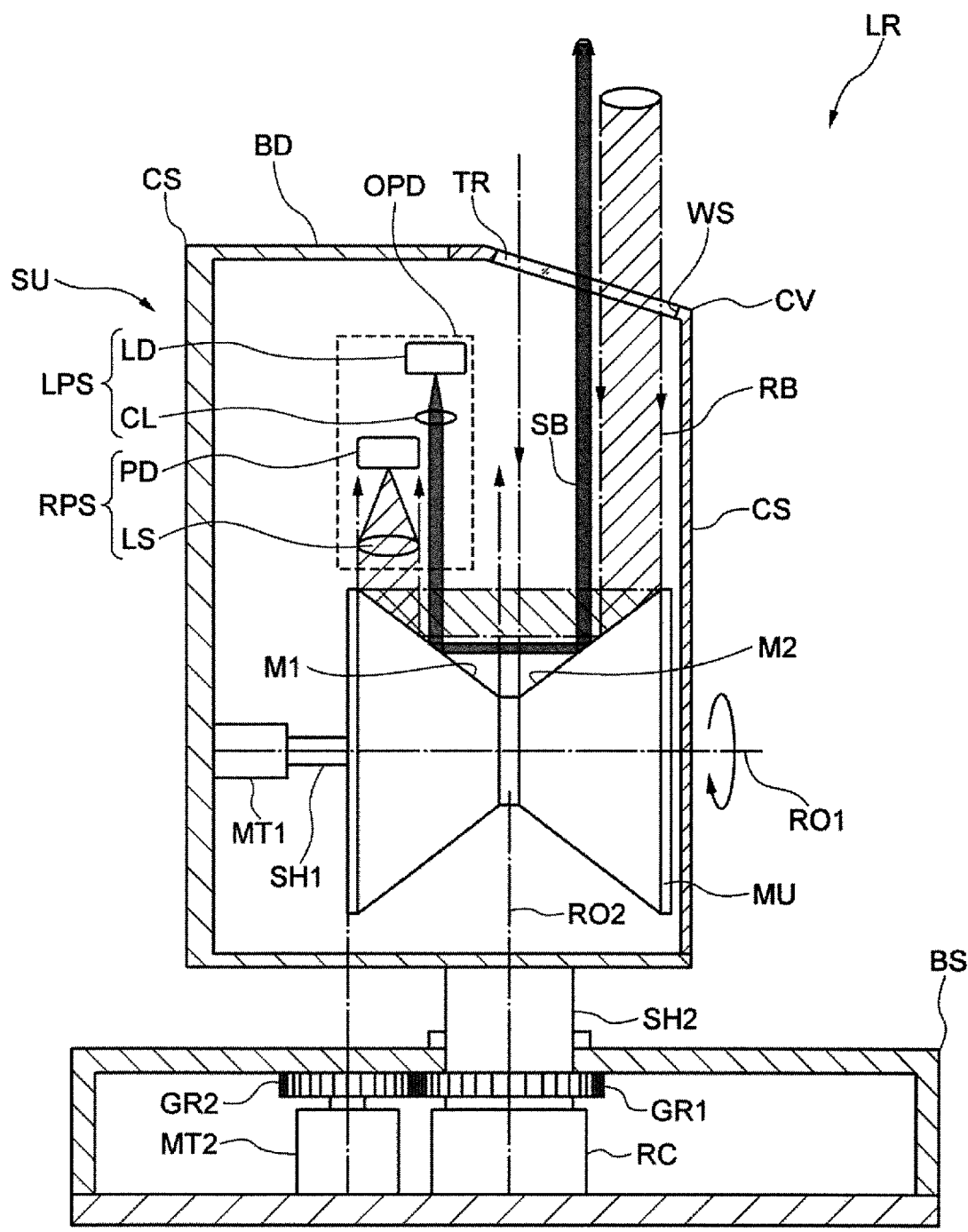
FIG. 16 is a schematic diagram illustrating a cross section of the laser radar in accordance with one or more embodiments.
Figure 17:
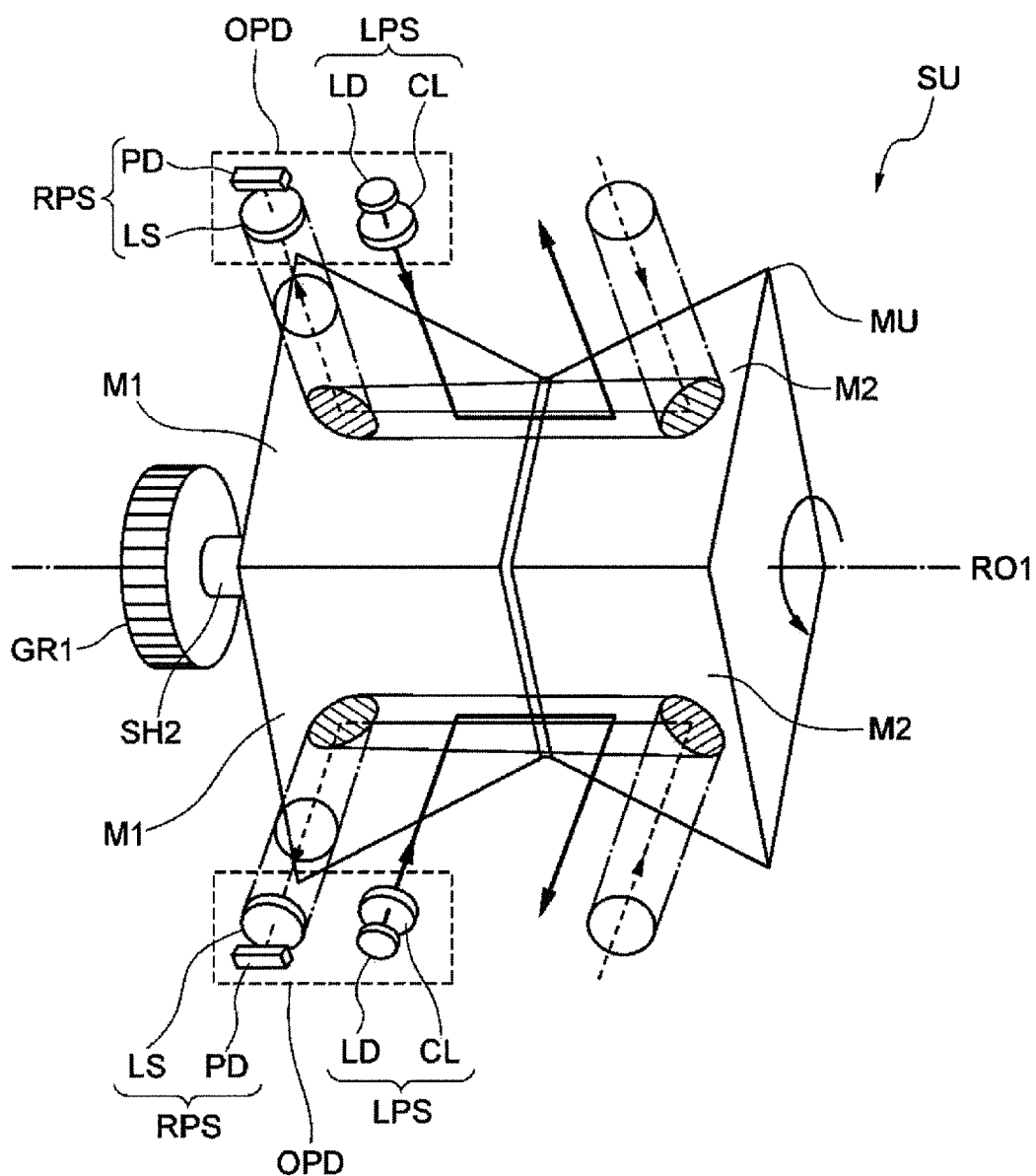
FIG. 17 is a perspective diagram illustrating main components of a scan unit in accordance with one or more embodiments excluding a case.

FIG. 14 is a perspective diagram illustrating a laser radar LR as an optical scanning type object detection device in accordance with one or more embodiments. FIG. 15 is a perspective diagram illustrating the laser radar LR in a state where a cover is detached. FIG. 16 is a schematic diagram illustrating a cross section of the laser radar LR in accordance with one or more embodiments. FIG. 17 is a perspective diagram illustrating main components of a scan unit SU in accordance with one or more embodiments excluding a case. In some cases, shapes, lengths, or the like of components may be different from actual ones.

As illustrated in FIGS. 14 and 15, the laser radar LR is configured to include a base BS and a scan unit SU which is rotatable with respect to the base BS. In FIG. 16, a main body BD of a case CS is connected to a rotary connector RC fixed to the base BS through a shaft SH2. The rotary connector RC enables data transmission between a light source or a light receiving portion of the rotating scan unit SU and an external fixed control unit (not illustrated) through GiGE communication in a contactless manner and enables power supply from an external power source (not illustrated) to the scan unit SU in a contactless manner.

A shaft SH2 is connected to a first gear GR1, and the first gear GR1 is engaged with a second gear GR2 connected to a rotation axis of a base motor MT2 fixed to the base BS. Herein, the rotation axis (second rotation axis) RO2 of the shaft SH2 is set to extend in the vertical direction. A rotational force of the base motor MT2 is transferred through the second gear GR2 and the first gear GR1 to the shaft SH2 to rotate the case CS of the scan unit SU at a predetermined speed. The base motor MT2, the second gear GR2, the first gear GR1, and the shaft SH2 constitute a rotation unit.

As illustrated in FIG. 16, the case CS has a shape of a hollow box formed by combining the main body BD and the cover CV. A window WS which allows the beam flux to be incident and to be emitted is formed in the side portion of the cover CV, and a curved transparent plate TR made of a glass or a resin is inserted to the window WS. Main components of the scan unit SU are accommodated in the case CS.

As illustrated in FIGS. 15 and 17, the scan unit SU is configured to include two light emitting/receiving units OPD. In FIGS. 16 and 17, the light emitting/receiving unit OPD is configured to include a semiconductor laser (light source) LD which emits a pulsed laser beam flux, a collimation lens CL which narrows a divergence angle of a divergent beam from the semiconductor laser LD to converts the divergent beam into a substantially parallel beam, a mirror unit MU which scan-projects the laser beam which is formed to be substantially parallel by the collimation lens CL to the object side by the rotating mirror plane and reflects a scattered beam from the scan-projected object, a lens LS which condenses the scattered beam from the object reflected by the mirror unit MU, and a photodiode (light receiving portion) PD which receives the condensed beam condensed by the lens LS. The photodiode PD is a light receiving element having a high amplification rate, for example, avalanche photodiode (APD) or the like, and a line sensor where a plurality of (herein, six) elements are arranged to be aligned in the direction (sub-scan direction) along the rotation axis RO1 of the mirror unit MU is used in one of more embodiments because the line sensor has high resolution.

The semiconductor laser LD and the collimation lens CL constitute a projection system LPS, and the lens LS and the photodiode PD constitute a light receiving system RPS. The optical axis of the projection system LPS and the optical axis of the light receiving system RPS are substantially perpendicular to the rotation axis RO1 of the mirror unit MU.

As illustrated in FIG. 17, the mirror unit MU has such a shape that two quadrangular pyramids are jointed in the opposite direction to be integrated. Namely, the mirror unit includes four mirror planes M1 and four mirror planes M2 which constitute pairs and are slanted in the facing direction. The crossing angles of the mirror planes M1 and M2 in the pairs are different. In one or more embodiments, the mirror planes M1 and M2 which are slanted with respect to the rotation axis RO1 are formed by vapor-depositing a reflecting film on a surface of a resin member (for example, PC) having a shape of a mirror unit. Three pairs, five pairs, or more of the mirror planes M1 and M2 may be provided.

As illustrated in FIG. 16, the mirror unit MU is connected to a shaft SH1 of a mirror motor MT1 fixed to the case CS to be rotationally driven at a predetermined speed. Herein, the rotation axis (first rotation axis) RO1 of the shaft SH1 is set to extend in the horizontal direction.

Next, objection detection operations of the laser radar LR will be described. In FIGS. 16 and 17, a pulsed divergent beam which is intermittently emitted from the semiconductor laser LD is converted into a substantially parallel beam flux by the collimation lens CL, is incident on the first mirror plane M1 of the rotating mirror unit MU, is reflected on the mirror plane, is further reflected on the second mirror plane M2, passes through a transparent plate TR, and is scan-projected on an external object side as a laser spot beam having a vertically-elongated (herein, the length in the vertical direction is larger than the length in the horizontal direction) rectangular cross section. Namely, with respect to the cross section of the beam flux at least at the time of being incident on the object, the length in the sub-scan direction (the later-described α direction) is larger than the length in the scan direction (the later-described θ direction). Herein, the emitted beam flux from the collimation lens CL is scanned by the rotating mirror unit MU. The scan direction is set to the θ direction.

Figure 18:
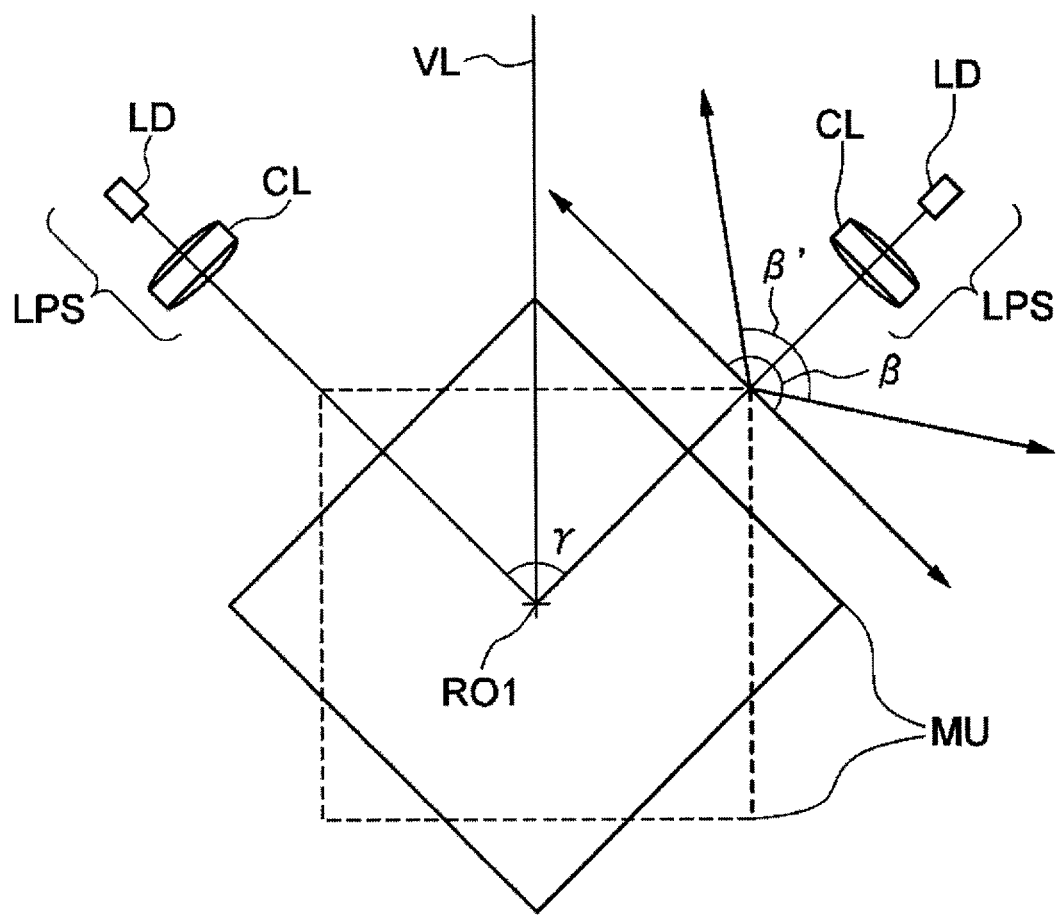
FIG. 18 is a diagram illustrating the scan unit as viewed in a direction of a rotation axis.

FIG. 18 is a diagram illustrating the scan unit SU as viewed in the direction of the rotation axis RO1. In FIG. 18, VL is the vertical line, and the mirror unit MU indicated by a dotted line is positioned at a rotation angle where the optical axis of one of the projection systems LPS crosses the vertical line. Herein, the beam flux emitted from the semiconductor laser LD through the collimation lens CL is reflected by the rotating mirror unit MU, and the ranges from one end to the other end of each of the mirror planes M1 and M2 in the rotation direction are used, so that a scan angle β is theoretically 180°. However, in actual cases, since the shape or size of the mirror unit MU is limited, an effective scan angle β' is about 100°.

Figure 19:
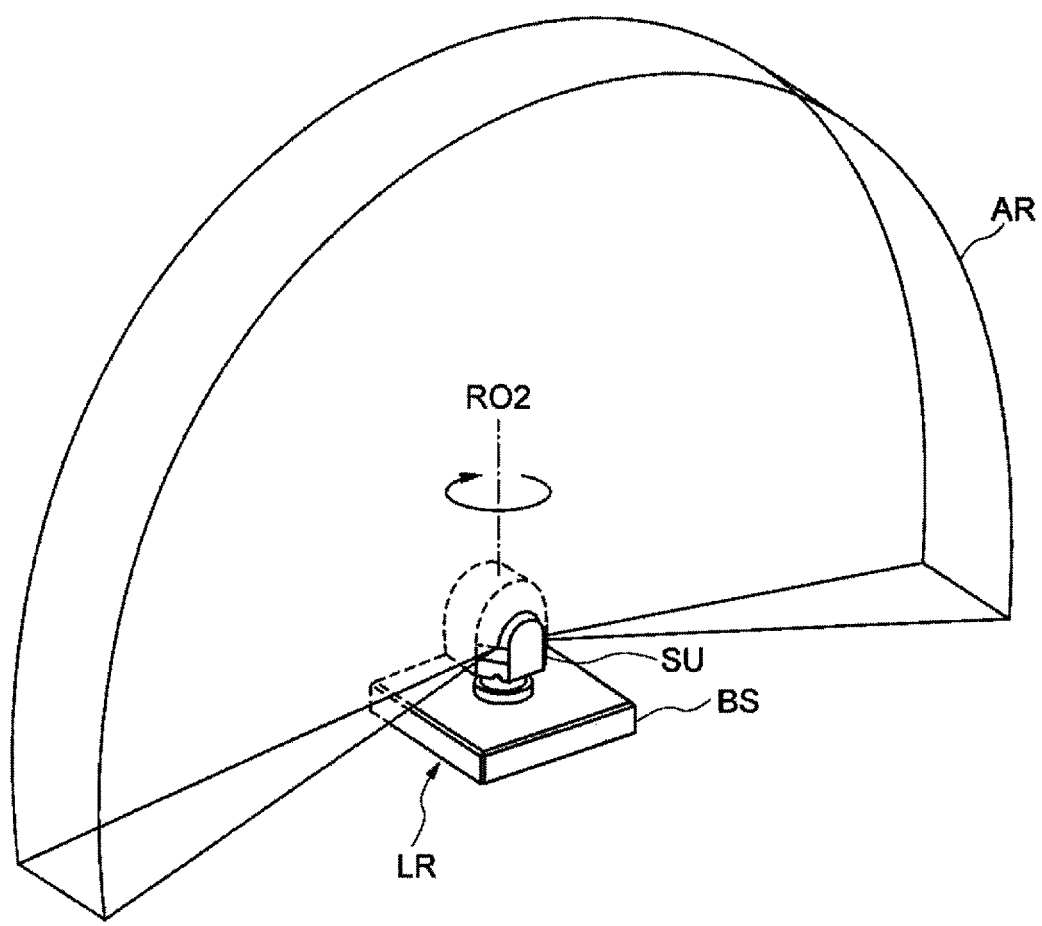
FIG. 19 is a diagram illustrating a unit rotation scan range which can be scanned with emitted beam fluxes from two light emitting/receiving units during one rotation of a mirror unit.

In one or more embodiments, the two light emitting/receiving units OPD are provided, and setting the crossing angle γ of the two projection systems LPS (in the θ direction) to 90°, the scan ranges partially overlap with each other. Therefore, as illustrated in FIG. 19, it is possible to detect the object without missing in the meridian direction of the celestial sphere. In addition, in the case where the base BS is installed in a tower or the like, since the emitted beam flux reaches the angle lower than the horizontal direction of the laser radar LR, it is possible to detect the object or the like approaching from the ground. Furthermore, by operating the two light emitting/receiving units OPD in parallel, the entire celestial sphere of 360° can be scanned twice while the scan unit SU performs one rotation, so that the scan efficiency is increased. AR illustrated in FIG. 19 indicates a unit rotation scan range which can be scanned with the emitted beam fluxes from the two light emitting/receiving units OPD while the mirror unit MU performs one rotation.

In addition, since the scan unit SU rotates around the rotation axis RO2 with respect to the base BS, the unit rotation scan range AR is displaced in the equator direction of the celestial sphere around the rotation axis RO2. The displacement direction is set to the α direction (refer to FIG. 20).

In one or more embodiments, the base motor MT2 and the mirror motor MT1 are step motors which can control a speed accurately.

Figure 20:
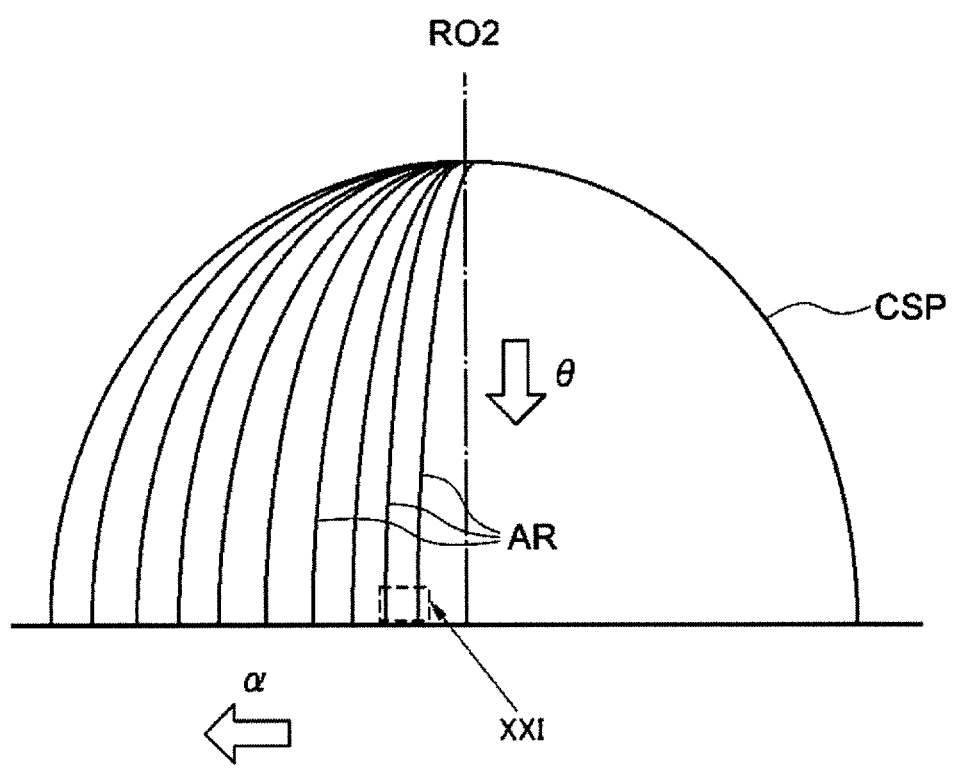
FIG. 20 is a diagram illustrating the unit rotation scan range which is displaced to be partially overlapped according to rotation displacement of the scan unit around a rotation axis in an equator direction ($\alpha$ direction) of a celestial sphere as viewed in a horizontal direction.
Figure 21:
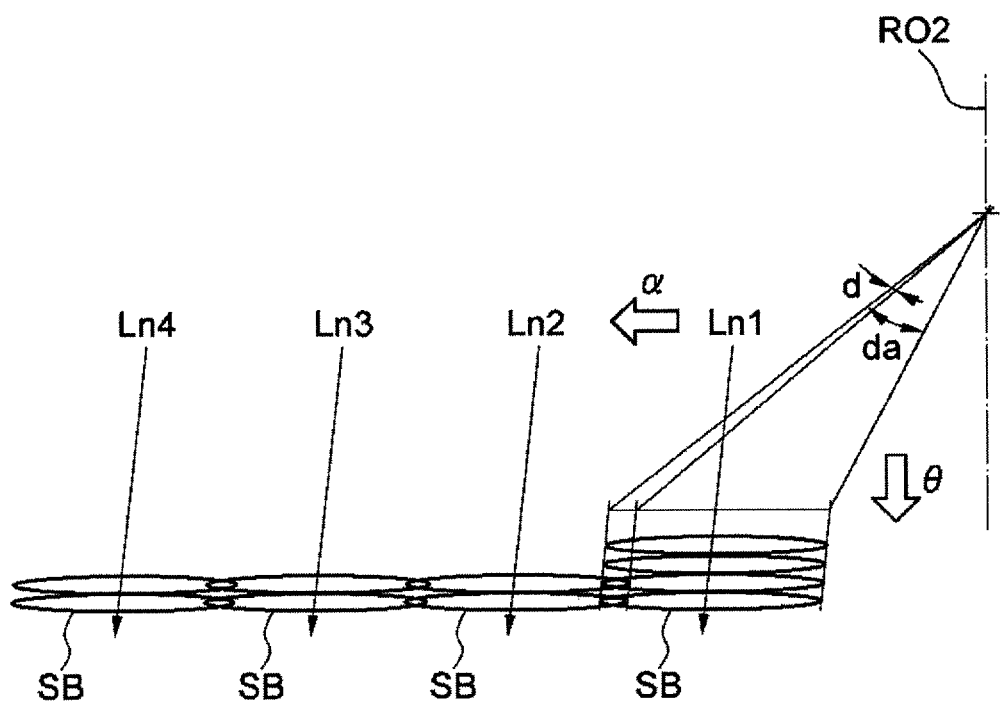
FIG. 21 is an enlarged diagram illustrating a portion XXI in FIG. 20.

FIG. 20 is a diagram illustrating the unit rotation scan ranges AR which are displaced to partially overlap while the scan unit SU is rotationally displaced around the rotation axis RO2 in the equator direction (a direction) of the celestial sphere as viewed in the horizontal direction, and FIG. 21 is an enlarged diagram illustrating a portion XXI in FIG. 20. As described above, in a combination of the first mirror plane M1 and the second mirror plane M2 of the mirror unit MU, the crossing angles are different. The emitted beam flux SB from one of the light emitting/receiving units OPD is sequentially reflected on the rotating first and second mirror planes M1 and M2. The range from the top to the bottom along the rightmost scan line Ln1 in FIG. 21 is scanned according to the rotation of the mirror unit MU with the emitted beam flux SB reflected on the first pair of the first and second mirror planes M1 and M2. Herein, the scanning with a pair of the mirror planes M1 and M2 is defined as one scanning.

Figure 22:
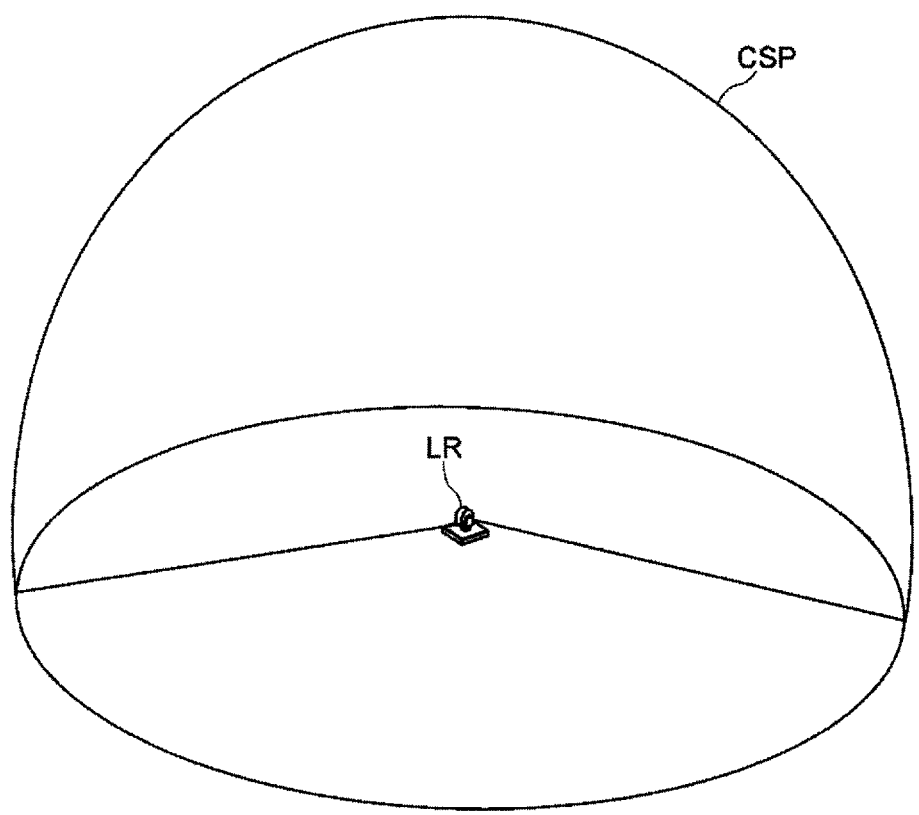
FIG. 22 is a schematic diagram illustrating an entire celestial sphere CSP of 360° where object detection can be performed by the laser radar.

Next, the range from the top to the bottom along the second scan line Ln2 from the right side in FIG. 21 is scanned according to the rotation of the mirror unit MU with the emitted beam flux SB reflected on the second pair of the first and second mirror planes M1 and M2. However, since the scan unit SU itself is rotated around the rotation axis RO2, in the case where the position in the θ direction is the same, the emitted beam flux SB scanned (subsequently scanned) along the scan line Ln2 is shifted by a predetermined amount in the α direction from the emitted beam flux SB scanned (precedently scanned) along the scan line Ln1. Accordingly, as illustrated in FIG. 22, it is possible to detect the object without missing by using the entire celestial sphere CSP of 360° as a detection area.

Herein, as illustrated in FIG. 21, when a spread angle (an angle between two lines from the rotation axis RO2 to two ends of the emitted beam flux SB in the α direction) of the emitted beam flux SB in the α direction which is to be scan-projected is denoted by dα and an overlapped angle (an angle between two lines from the rotation axis RO2 to two ends of an overlapped portion of the emitted beam flux SB in the α direction) between the emitted beam flux SB which is to be scan-projected by the first scanning and the emitted beam flux SB which is to be scan-projected by the second scanning is denoted by d, Mathematical Formula (1) is satisfied.

$$0 < d < d\alpha/2 \qquad (1)$$

When the overlapped angled is larger than the lower limit of Mathematical Formula (1), there is no gap between the emitted beam flux SB which is to be scan-projected by the first scanning and the emitted beam flux SB which is to be scan-projected by the second scanning, so that it is possible to prevent missing of the object detection. On the other hand, when the overlapped angle d is smaller than the upper limit of Mathematical Formula (1), the overlapped amount of the emitted beam flux is suppressed, so that it is possible to improve the scan efficiency.

Next, the range from the top to the bottom along the third scan line Ln3 from the right side in FIG. 21 is scanned according to the rotation of the mirror unit MU with the emitted beam flux SB reflected on the third pair of the first and second mirror planes M1 and M2. The relationship between the emitted beam flux SB which is to be scan-projected by the second scanning and the emitted beam flux SB which is to be scan-projected by the third scanning also satisfies Mathematical Formula (1).

Next, the range from the top to the bottom along the leftmost scan line Ln4 in FIG. 21 is scanned according to the rotation of the mirror unit MU with the emitted beam flux SB reflected on the fourth pair of the first and second mirror planes M1 and M2. The relationship between the emitted beam flux SB which is to be scan-projected by the third scanning and the emitted beam flux SB which is to be scan-projected by the fourth scanning also satisfies Mathematical Formula (1). Accordingly, scanning by one rotation of the mirror unit MU is completed. After one rotation of the mirror unit MU, when the first pair of the first and second mirror planes M1 and M2 is returned to the position where the emitted beam flux SB is incident, the scanning along the scan line Ln1 is repeated again. The relationship between the emitted beam flux SB which is to be scan-projected by the new first scanning and the emitted beam flux SB which is to be scan-projected by the precedent fourth scanning also satisfies Mathematical Formula (1).

In FIG. 16, when the scan-projected beam flux reaches the object, a portion of the scattered beam scattered from the object passes through the transparent plate TR again to be incident on the second mirror plane M2 of the mirror unit MU in the case CS, is reflected on the mirror plane, is further reflected on the first mirror plane M1, is condensed by the lens LS, and is detected on the light receiving plane of the photodiode PD. The time difference between the emitting time point of the semiconductor laser LD and the detecting time point of the photodiode PD is obtained by a circuit (not illustrated), so that the distance to the object can be obtained.

However, although the scattered beam from the object is reflected, for example, on the entire planes of the first and second mirror planes M1 and M2, the beam is narrowed by the lens LS (herein, a circular shape but not limited to the circular shape) having a function as an aperture stop, and finally, a portion of the beam is incident on the photodiode PD. Namely, the beam other than the scattered beam indicated by hatching in FIG. 16 is not incident on the photodiode PD and, thus, is not used for light receiving. Herein, when the beam flux condensed by the lens LS is set as a received beam flux RB, as illustrated by one dot dashed line in FIG. 17, the received beam flux RB having a predetermined cross section is incident on the lens LS through the first and second mirror planes M1 and M2. In one or more embodiments, since the photodiode PD is formed as a line sensor where six elements are arranged to be aligned, the received beam flux RB from the object in one scanning is divided into six beams to be received, so that it is possible to detect the object with high resolution. With respect to the other light emitting/receiving unit OPD, the same operation is performed in parallel in the opposite side of the rotation axis RO2.

In one or more embodiments, by using the emitted beam flux having a large width in the α direction and the photodiode PD as a line sensor where a plurality of elements are aligned in the direction corresponding to the α direction, wide detection can be performed in the α direction by one scanning, so that it is possible to improve the scan efficiency. In addition, the scanning in the θ direction can be performed by rotating the mirror unit MU, so that the scanning in a limited necessary range can be performed. Particularly, in comparison with the case where the scanning over 360° in the θ direction on a single one mirror plane is performed, the scanning of the unnecessary space (herein, the space below the horizon) is distributed in the θ direction, and thus, plural times (herein, four times) of scanning in the θ direction by one rotation of the mirror unit can be performed. Accordingly, the detection area of the entire celestial sphere of 360° can be scanned without gap at a high speed, so that it is possible to detect objects invading from any direction. Furthermore, by obtaining three-dimensional polar coordinates of the detected object and obtaining three-dimensional polar coordinates of the same object detected by opening a specific time interval, the speed can be calculated.

In addition, in accordance with one or more embodiments, since the mirror unit MU where the second mirror plane M2 is arranged to face the first mirror plane M1 is used, the emitted laser beam is incident on the first mirror plane M1 of the rotating mirror unit MU, is reflected on the mirror plane, is propagated along the rotation axis, is further reflected on the second mirror plane M2, and is scan-projected on the object. Due to such a configuration, longitudinal distortion of the spot beam with which the object is irradiated and rotation of the spot are suppressed, so that it is possible to secure a wide viewing range and to suppress change in resolution.

Figure 23:
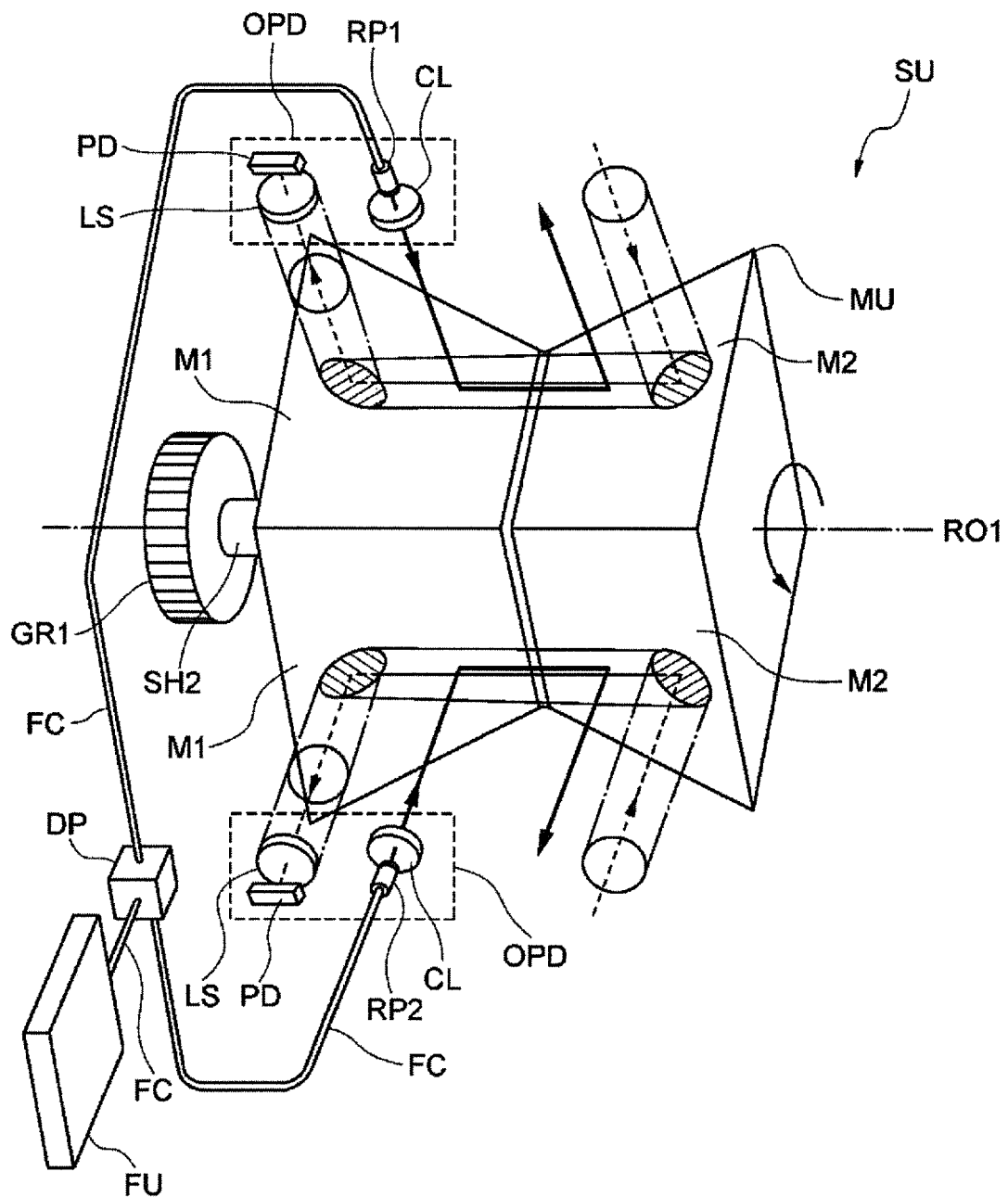
FIG. 23 is a diagram illustrating main components of a scan unit in accordance with one or more embodiments.

FIG. 23 is a diagram illustrating main components of a scan unit SU in accordance with one or more embodiments. In the example of FIG. 23, as a light source, a fiber laser is used instead of the semiconductor laser. The fiber laser has a characteristic in that an excited beam is allowed to enter a specific optical fiber where rare earth elements are added to a core, only a beam having a specific wavelength is confined in the core to be amplified to be emitted as a laser beam having a high intensity, and an emitted beam is propagated through a fiber cable, so that a light emitting point can be arranged at an arbitrary position.

Therefore, in accordance with one or more embodiments, a fiber cable FC is allowed to extend from a single fiber laser unit FU and is branched at a branch point DP, and the fiber cables FC are further allowed to extend to the first and second light emitting portions RP1 and RP2. The laser beam having a high intensity emitted from the fiber laser unit FU is propagated through the fiber cable FC, is branched at the branch point DP to reach the first and second light emitting portions RP1 and RP2 through the fiber cables FC, and is emitted from the light emitting portions toward the collimation lens CL. Other configurations are the same as those of the above-described embodiments, and thus, the description thereof is omitted.

Figure 24:
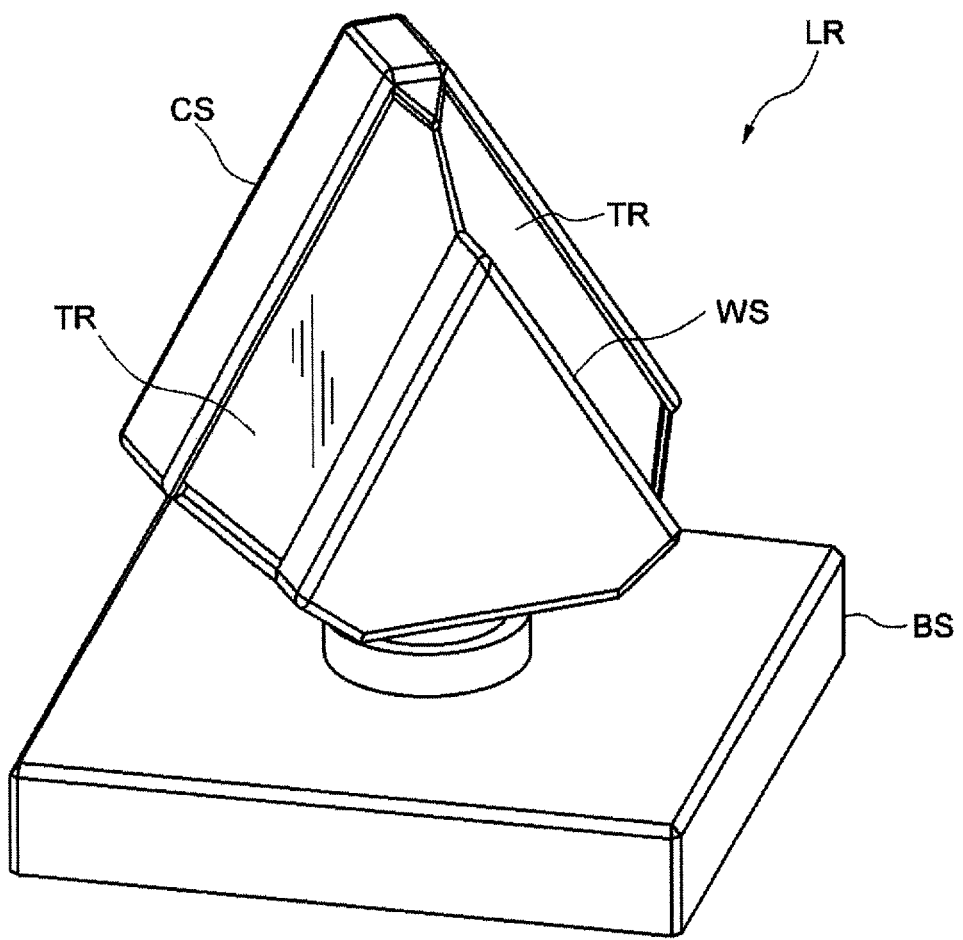
FIG. 24 is a perspective diagram illustrating a laser radar in accordance with one or more embodiments.

FIG. 24 is a perspective diagram illustrating a laser radar LR in accordance with one or more embodiments. In the example of FIG. 24, the case CS of the scan unit SU has a triangular cylindrical shape, and the two transparent plates TR inserted into the window WS have a flat plate shape. In this manner, by slanting the transparent plate TR which is a light transmissive member with respect to the horizontal plane, dust, water droplets, and the like are hard to adhere, so that maintenance such as cleaning can be simplified. A wiper device may be arbitrarily provided to the transparent plate TR.

Figure 25:
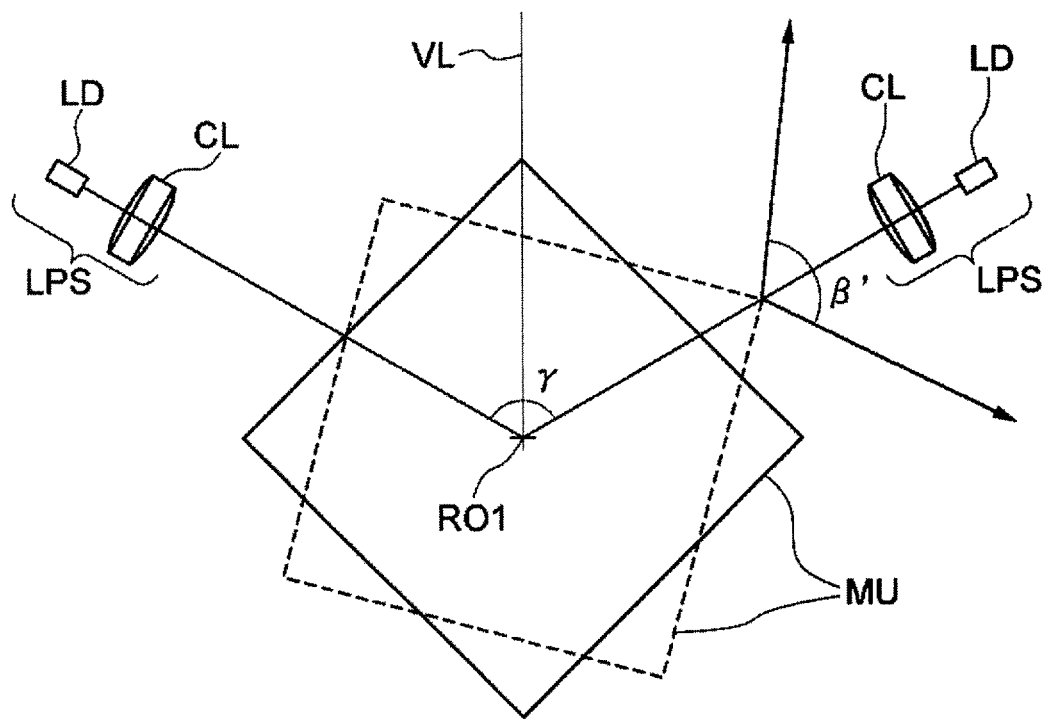
FIG. 25 is a diagram illustrating a scan unit in accordance with one or more embodiments as viewed in a direction of a rotation axis.
Figure 26:
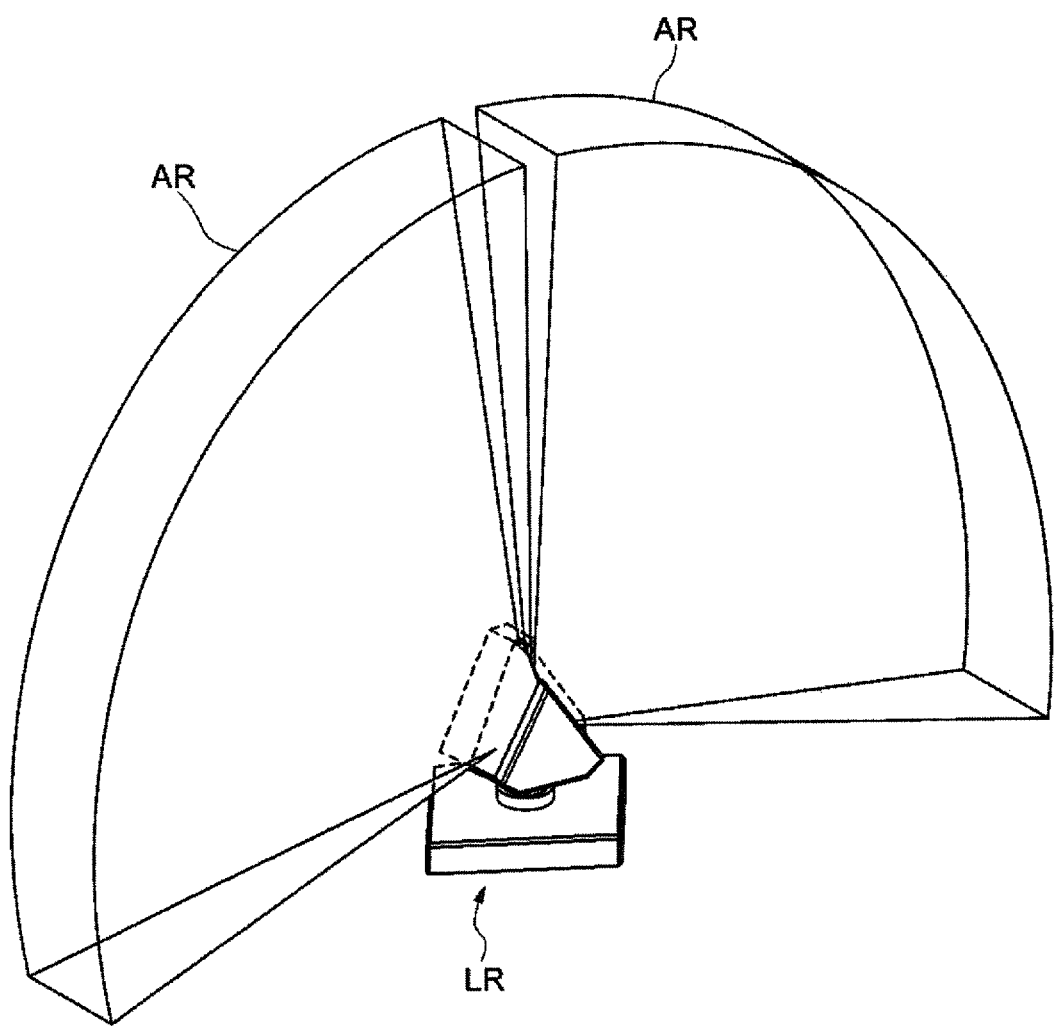
FIG. 26 is a diagram illustrating a unit rotation scan range which can be scanned with emitted beam fluxes from two light emitting/receiving units during one rotation of a mirror unit in accordance with one or more embodiments.
Figure 27:
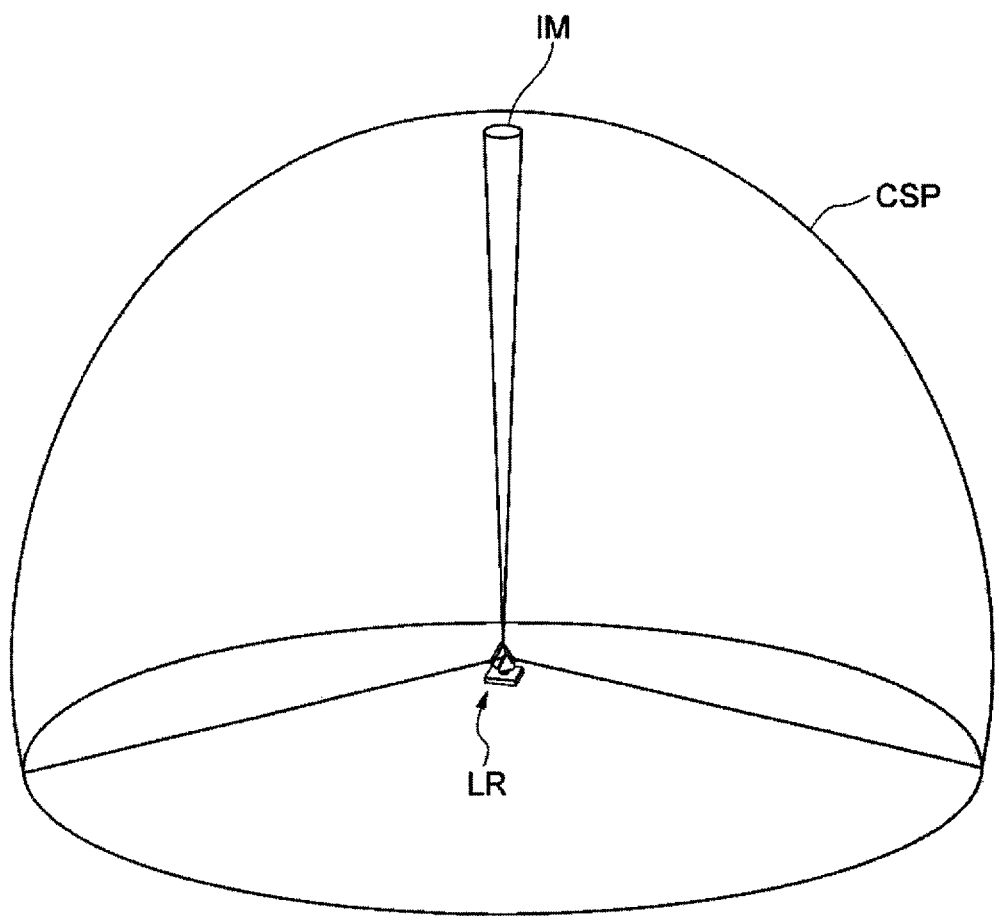
FIG. 27 is a schematic diagram illustrating an entire celestial sphere CSP of 360° where object detection can be performed by a laser radar in accordance with one or more embodiments.

FIG. 25 is a diagram illustrating the scan unit SU in accordance with one or more embodiments as viewed in the direction of the rotation axis RO1. In FIG. 25, VL is the vertical line, and the mirror unit MU indicated by a dotted line is positioned at a rotation angle where the optical axis of one of the projection systems LPS crosses the vertical line. In the example of FIG. 25, since the crossing angle γ of the two projection systems LPS is set to 110°, as illustrated in FIG. 26, the unit rotation scan ranges AR defined by the emitted beam flux emitted from the two projection systems LPS do not overlap. Since this position becomes the boundary between the two transparent plates TR, influence on the emitted beam flux emitted through the transparent plate TR can be prevented. When the scan unit SU is rotated in this state, as illustrated in FIG. 27, an area IM where object detection is impossible occurs in the vicinity of the zenith of the celestial sphere CSP. However, objects are less likely to invade from the vicinity of the zenith of celestial sphere CSP although the area IM where object detection is impossible is provided. In addition, as illustrated in FIG. 25, by increasing the crossing angle γ of the two projection systems LPS, the scan range on the ground side is widened, and thus, the scan unit can be provided to a tower which is higher than the base BS, so that there is also an effect in that it is easy to perform the object detection while avoiding obstacles on the ground.

Hereinafter, a result of studies performed by the inventors and the like will be described. As a specification of the laser radar, the scan time t over the entire orientation of 360° is set to 1.25 sec. The mirror unit MU is rotated at a rotation speed of 10 sec$^{-1}$. Therefore, the rotation speed rθ of the mirror in the θ direction is 40 sec$^{-1}$. Herein, in order to satisfy the above-described Mathematical Formula (1), in one or more embodiments the spread angle dα of the emitted beam flux in the α direction is set to be within a range expressed by the following Mathematical Formula.

$$180/(r\theta \times t) < d\alpha < 360/(r\theta \times t) \quad (2)$$

By inserting numeric values into Mathematical Formula (2), 3.6<dα<7.2 is obtained. Herein, by adjusting the collimation lens CL so that the spread angle dα of the emitted beam flux in the α direction becomes 3.75° and the spread angle dθ of the emitted beam flux in the θ direction becomes 0.12°, a horizontally-elongated beam flux is allowed to be emitted in the α direction.

With respect to the scanning by a pair of the mirror planes M1 and M2 in the mirror unit MU, since four times of the scanning of 100° in the θ direction are performed in the θ direction every one rotation, the scan range per light emitting/receiving unit OPD is 100° in the θ direction and 14.55° (=3.75° pitch×4 lines−0.15°×3) in the α direction. The spread angle dα of the emitted beam flux is set to 3.75°, and the overlapped angle d of the emitted beam flux is set to 0.15°. By arranging the two light emitting/receiving units OPD so that the end of the scan range is coincident with the zenith of the celestial sphere, the scanning can be performed in the range of 200° in the θ direction and 14.55° in the α direction.

Herein, in the case where the scanning is performed by the laser radar LR over the entire orientation of 360° for 1.25 sec, the scanning can be shared by the two light emitting/receiving units OPD, and thus, the scanning can be performed over a half of the entire orientation, that is, 180° for 1.25 sec. In addition, the rotation speed rα of the scan unit SU is set to 0.4 sec$^{-1}$ (2.5 sec/rotation).

Studies were made by using a semiconductor laser having a light source wavelength of 870 nm to the laser radar LR in accordance with one or more embodiments illustrated in FIGS. 14 to 22 and applying the above-described conditions. It was observed that it is possible to detect objects in any direction on the ground and in the air, and detection can be performed at a position separated by 100 m in the case of a vehicle, at a position separated by 50 m in the case of a person, and at a position separated by 35 m in the case of a drone with a maximum dimension of 30 cm.

The above-described study is exemplary, and a spatial resolution can be adjusted by changing the intensity of the emitted beam flux, the spread angle of the emitted beam flux, the number of light receiving elements in the photodiode PD, the plane angle of the mirror unit or the like according to the size of the detection object.

Furthermore, studies were made by applying a fiber laser capable of emitting a beam flux having a wavelength of 1550 nm as a light source and a sensor which is sensitive to a wavelength of 1550 nm, for example, an APD sensor made of InGaAs as a light receiving portion in the laser radar LR in accordance with one or more embodiments illustrated in FIG. 21. Since a human has a retina with a low sensitivity to the laser beam having a wavelength of 1550 nm, that is, a so-called eye safe characteristic, it is possible to raise the light quantity while satisfying the laser class 1, and the laser beam is particularly suitable for detecting a distant object. The specification that the scan time of the scan unit SU over the entire orientation of 360° is set to 1.25 sec and the mirror unit MU is rotated at the rotation speed of 10 sec$^{-1}$ is common.

It was observed that, according to the above-described configuration, detection and tracking of an object having a maximum dimension of 30 cm can be performed at a position separated by 200 m. In this case, for example, if it is assumed that a drone having the same size approaches the laser radar LR from the outside of the detection range (radius: 200 m) of the laser radar LR in accordance with one or more embodiments, the drone does not reach the laser radar LR for 1.25 sec, that is, the interval between the consecutive scanning, and after detection, some time to consider how to cope with the invading drone is needed.

Since a general drone can fly at 50 km/hour (approximately, 14 m/sec), the maximum distance that the drone can approach without being detected is 14×1.25=17.5 m. Namely, the invading drone can be detected at an early stage outside the position separated by 182.5 m from the laser radar LR, and a sufficient time to consider how to cope with the invading drone after the detection can be secured, so that it can be found that the laser radar LR in accordance with one or more embodiments is effective.

Embodiments of the present invention make it possible to provide an optical scanning type object detection device having a wide detection area exceeding, for example, 180° and being capable of effectively detecting an object invading the detection area with a relatively simple configuration and low cost.

It will be apparent to the person skilled in the art from the embodiments and ideas disclosed in the specification that the present invention is not limited to the embodiments disclosed in the specification, but other embodiments and modifications are included. Although the present invention has been described and illustrated in detail, it is clearly understood that the same is by way of illustrated and example only and is not to be taken by way of limitation, the scope of the present invention being interpreted by terms of the appended claims. For example, one light emitting/receiving unit OPD may be used. In addition, instead of the mirror unit MU, scanning with the emitted beam flux may be performed by rotating one mirror. In addition, the crossing angle γ of the projection system LPS may be arbitrarily set.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical scanning object detection device comprising:
    a first optical transceiver that:
        generates a first beam flux, and
        receives a scattered portion of the first beam flux;
    a second optical transceiver that:
        generates a second beam flux, and
        receives a scattered portion of the second beam flux; and
    a mirror unit that rotates around a rotation axis, wherein
    the first beam flux is reflected by the mirror unit and is scanned based on the rotation of the mirror unit, and the scattered portion of the first beam flux is generated by scattering of the first beam flux by an object,
    the scattered portion of the first beam flux is reflected by the mirror unit before being received by a light receiving portion of the first optical transceiver,
    the second beam flux is reflected by the mirror unit and is scanned based on the rotation of the mirror unit, and the scattered portion of the second beam flux is generated by scattering of the second beam flux by the object,
    the scattered portion of the second beam flux is reflected by the mirror unit before being received by a light receiving portion of the second optical transceiver, and
    with respect to a shape of a cross section of the first beam flux or the second beam flux projected to the object, a first dimension of the shape of the cross section in a sub-scan direction perpendicular to a scan direction is larger than a second dimension of the shape of the cross section in a scan direction.

2. The optical scanning object detection device according to claim 1, wherein
    the mirror unit comprises a first mirror plane and a second mirror plane,
    each of the first mirror plane and the second mirror plane is slanted with respect to the rotation axis,
    the first mirror plane and the second mirror plane face each other at a predetermined angle,
    each of the first beam flux and the second beam flux is reflected by the first mirror plane and the second mirror plane,
    each of the scattered portion of the first beam flux and the scattered portion of the second beam flux is reflected by the second mirror plane and the first mirror plane,
    the first beam flux and the second beam flux are reflected by the first mirror plane and the second mirror plane in a first order,
    the scattered portion of the first beam flux and the scattered portion of the second beam flux are reflected by the first mirror plane and the second mirror plane in a second order, and
    the first order is a reverse order of the second order.

3. The optical scanning object detection device according to claim 2, wherein the mirror unit comprises:
    a plurality of pairs of the first mirror plane and the second mirror plane,
    wherein each of the pairs has a crossing angle between the first mirror plane and the second mirror plane that is different from the crossing angle of each other pair of the plurality of pairs.

4. The optical scanning object detection device according to claim 3, wherein an optical axis of the first optical transceiver and an optical axis of the second optical transceiver are separated by 180°±5°.

5. The optical scanning object detection device according to claim 4, wherein the plurality of pairs comprises three pairs.

6. The optical scanning object detection device according to claim 3, further comprising:
    a third optical transceiver,
    wherein each optical axis of the first optical transceiver, the second optical transceiver, and the third optical transceiver is radially arranged at intervals of 120° to each other.

7. The optical scanning object detection device according to claim 6, wherein the plurality of pairs comprises four pairs.

8. The optical scanning object detection device according to claim 1, wherein
    each of the first optical transceiver and the second optical transceiver comprises a plurality of light receiving regions, and
    the light receiving regions are arranged in the sub-scan direction to receive the scattered portion of the first beam flux or the scattered portion of the second beam flux.

9. The optical scanning object detection device according to claim 1, further comprising a rotator that rotates the mirror unit around a second rotation axis, wherein
    when the mirror unit rotates in a θ direction around a first rotation axis, the rotator rotates the mirror unit, the first optical transceiver, and the second optical transceiver integrally in an α direction around the second rotation axis,
    the second axis of rotation is different from the first rotation axis, with respect to a shape of a cross section of the first beam flux or the second beam flux when incident on the object, a first dimension of the shape of the cross section in the θ direction is smaller than a second dimension of the shape of the cross section in the α direction, the first beam flux or the second beam flux projected by precedent scanning and the first beam flux or the second beam flux projected by subsequent scanning partially overlap in the α direction, and when a spread angle of the scanned first beam flux or the second beam flux in the α direction is denoted by dα and an overlapped angle of the first beam flux or the second beam flux projected by the precedent scanning and the first beam flux or the second beam flux projected by the subsequent scanning is denoted by d, Mathematical Formula (1) is satisfied:

$$0 < d < d\alpha/2 \quad (1).$$

10. The optical scanning object detection device according to claim 9, wherein a position of the optical axis of a light source of the first optical transceiver and a position of the optical axis of a light source of the second optical transceiver are different from each other in the θ direction.

11. The optical scanning object detection device according to claim 9, wherein a light source of the first optical transceiver or the second optical transceiver comprises a plurality of end portions that branch a beam emitted from a single light emitter by branch paths to emit the branched beams.

12. The optical scanning object detection device according to claim 9, wherein the first rotation axis is along a horizontal direction, and the second rotation axis is along a vertical direction.

13. The optical scanning object detection device according to claim 1, wherein the mirror unit, the first optical transceiver, and the second optical transceiver are configured to be disposed in a case, the first beam flux or the second beam flux is configured to be scan-projected on the object through a window formed in the case, the scattered portion of the first beam flux or the scattered portion of the second beam flux from the object is incident on the window, and a light transmissive member covering the window is slanted with respect to a horizontal direction.

* * * * *